United States Patent
Wen et al.

(10) Patent No.: US 11,501,614 B2
(45) Date of Patent: Nov. 15, 2022

(54) SKIP-SCANNING IDENTIFICATION METHOD, APPARATUS, AND SELF-SERVICE CHECKOUT TERMINAL AND SYSTEM

(71) Applicant: ALIBABA GROUP HOLDING LIMITED, Grand Cayman (KY)

(72) Inventors: Jie Wen, Beijing (CN); Yetao Fu, Beijing (CN); Wensheng Jiang, Shanghai (CN); Yu Zhu, Shanghai (CN); Yang Liu, Beijing (CN); Fei Shen, Beijing (CN); Xiaowei Zhao, Beijing (CN); Hui Liu, Beijing (CN); Hao Yang, Beijing (CN)

(73) Assignee: ALIBABA GROUP HOLDING LIMITED, George Town (KY)

( * ) Notice: Subject to any disclaimer, the term of this patent is extended or adjusted under 35 U.S.C. 154(b) by 0 days.

(21) Appl. No.: 17/186,682

(22) Filed: Feb. 26, 2021

(65) Prior Publication Data
US 2021/0183212 A1   Jun. 17, 2021

Related U.S. Application Data

(63) Continuation of application No. PCT/CN2019/101520, filed on Aug. 20, 2019.

(30) Foreign Application Priority Data

Aug. 28, 2018 (CN) .......................... 201810987941.7

(51) Int. Cl.
*G06Q 20/20* (2012.01)
*G07G 3/00* (2006.01)
(Continued)

(52) U.S. Cl.
CPC ........... *G07G 3/006* (2013.01); *G06Q 20/206* (2013.01); *G06V 20/41* (2022.01); *G06V 40/28* (2022.01);
(Continued)

(58) Field of Classification Search
CPC ...... G07G 3/006; G07G 1/0045; G07G 1/145; G07G 1/0063; G06Q 20/206; G06Q 20/18;
(Continued)

(56) References Cited

U.S. PATENT DOCUMENTS 7,272,570 B2   9/2007  Sadler
7,448,542 B1*  11/2008  Bobbitt ............... G06Q 20/208
                                             235/383
(Continued)

FOREIGN PATENT DOCUMENTS

CN    101615014 A    12/2009
CN    106251520 A    12/2016
(Continued)

OTHER PUBLICATIONS

Tarnowski, Joseph. "Good night, sweethearting". Progressive Grocer. May 2008, p. 126. (Year: 2008).*
(Continued)

*Primary Examiner* — Nathan A Mitchell

(57) ABSTRACT

Embodiments of the present invention provide a skip-scanning identification method and apparatus, a self-service cash register terminal and system. The method includes: obtaining a video of a user scanning an item; determining posture data of the user based on the obtained video; determining, according to the posture data of the user, a time period in which a scanning action of the user takes place; receiving a scanning result of the item; and determining whether the user has skipped scanning the item based on the scanning result and the time period.

20 Claims, 7 Drawing Sheets

---

Acquire a video of a user scanning items — 201

Obtain a detection result of skip-scanning behavior of the user according to the video — 202

(51) Int. Cl.
*G07G 1/00* (2006.01)
*G07G 1/14* (2006.01)
*G08B 13/196* (2006.01)
*G06V 20/40* (2022.01)
*G06V 40/20* (2022.01)
*G06K 7/10* (2006.01)
*G06K 7/14* (2006.01)
*G06Q 20/18* (2012.01)

(52) U.S. Cl.
CPC .......... *G07G 1/0045* (2013.01); *G07G 1/145* (2013.01); *G08B 13/19691* (2013.01); *G06K 7/10861* (2013.01); *G06K 7/1413* (2013.01); *G06K 7/1417* (2013.01); *G06Q 20/18* (2013.01); *G06V 20/44* (2022.01)

(58) Field of Classification Search
CPC ...... G06Q 20/208; G06V 20/41; G06V 40/28; G06V 20/44; G06V 20/52; G08B 13/19691; G08B 13/19613; G08B 25/08; G06K 7/10861; G06K 7/1413; G06K 7/1417
See application file for complete search history.

(56) References Cited

U.S. PATENT DOCUMENTS

| | | | |
|---|---|---|---|
| 7,503,490 B1* | 3/2009 | Bobbitt | G06Q 20/208 |
| | | | 235/383 |
| 8,403,215 B2 | 3/2013 | Aihara et al. | |
| 8,448,858 B1* | 5/2013 | Kundu | G07G 3/003 |
| | | | 235/383 |
| 8,448,859 B2* | 5/2013 | Goncalves | G06K 5/00 |
| | | | 235/383 |
| 8,473,363 B1 | 6/2013 | Oakes, III | |
| 8,570,375 B1* | 10/2013 | Srinivasan | H04N 7/181 |
| | | | 235/383 |
| 8,577,729 B2 | 11/2013 | Iizaka et al. | |
| 9,218,580 B2* | 12/2015 | Libal | G06Q 20/20 |
| 9,357,949 B2 | 6/2016 | Drew | |
| 9,536,236 B2 | 1/2017 | Hay | |
| 9,715,672 B2 | 7/2017 | Daily et al. | |
| 9,799,023 B2 | 10/2017 | Jacobs | |
| 2010/0059589 A1* | 3/2010 | Goncalves | G07G 1/0054 |
| | | | 382/218 |
| 2011/0057035 A1 | 3/2011 | Matsuhisa et al. | |
| 2013/0250115 A1* | 9/2013 | Fan | G07G 1/009 |
| | | | 348/150 |
| 2014/0176719 A1* | 6/2014 | Migdal | G06T 3/0006 |
| | | | 348/150 |
| 2014/0222603 A1 | 8/2014 | Hay | |
| 2015/0193763 A1 | 7/2015 | Cyr et al. | |
| 2015/0235197 A1 | 8/2015 | Edwards | |
| 2016/0078300 A1* | 3/2016 | Kundu | G07F 17/3241 |
| | | | 348/150 |
| 2016/0106339 A1 | 4/2016 | Behzadi et al. | |
| 2016/0253700 A1 | 9/2016 | Dokken | |
| 2017/0195558 A1 | 7/2017 | Maruyama et al. | |
| 2017/0329328 A1 | 11/2017 | Horita et al. | |
| 2018/0096567 A1* | 4/2018 | Farrow | G07G 3/003 |
| 2018/0193648 A1 | 7/2018 | Skelton et al. | |
| 2018/0365951 A1* | 12/2018 | Costello | G06K 7/10 |
| 2020/0356826 A1* | 11/2020 | Khedr | G06V 20/52 |
| 2021/0216785 A1* | 7/2021 | Debucean | G06V 40/11 |

FOREIGN PATENT DOCUMENTS

| | | |
|---|---|---|
| CN | 207517142 U | 6/2018 |
| JP | 2007-206996 A | 8/2007 |
| JP | 4038232 B1 | 1/2008 |
| JP | 2008-027427 A | 2/2008 |
| JP | 2008-538030 A | 10/2008 |
| JP | 2011-054127 A | 3/2011 |
| WO | 2006105376 A2 | 10/2006 |
| WO | 2006105376 A3 | 12/2007 |

OTHER PUBLICATIONS

Prasad Gabburet et al. A pattern discovery approach to retail fraud detection. In Proceedings of the 17th ACM SIGKDD international conference on Knowledge discovery and data mining (KDD '11). Association for Computing Machinery, New York, NY, USA, 307-315. 2011. (Year: 2011).*

Quanfu Fan et al., "Detecting sweethearting in retail surveillance videos," 2009 IEEE International Conference on Acoustics, Speech and Signal Processing, 2009, pp. 1449-1452. (Year: 2009).*

International Preliminary Report on Patentability Chapter I for PCT Application No. PCT/CN2019/101520 dated Mar. 11, 2021.

Office Action for Japanese Application No. 2021-510931 dated Aug. 2, 2022.

Written Opinion and International Search Report for PCT Application No. PCT/CN2019/101520 dated Nov. 19, 2020.

* cited by examiner

SKIP-SCANNING IDENTIFICATION METHOD, APPARATUS, AND SELF-SERVICE CHECKOUT TERMINAL AND SYSTEM

CROSS-REFERENCE TO RELATED APPLICATIONS

This application is a continuation application of International Application No. PCT/CN2019/101520, filed on Aug. 20, 2019, which claims priority to Chinese Patent Application 201810987941.7, filed on Aug. 28, 2018 and entitled "MISSING SCAN IDENTIFICATION METHOD, APPARATUS, AND SELF-SERVICE CASH REGISTER TERMINAL AND SYSTEM." The entire contents of the above-identified applications are incorporated herein by reference in their entirety.

TECHNICAL FIELD

This application relates to the field of computer technologies, and in particular, to a skip-scanning identification method and apparatus for a self-service checkout terminal and system.

BACKGROUND

With the continuous development of retailing and the continuous progress of electronic technologies, the settlement mode in malls changes continuously. To resolve the problem of over-queued people for payment and lighten the burden of cashiers in malls, self-service checkout machines are invented correspondingly. Mostly, the self-service checkout machines are disposed at the exit of the mall for customers to scan items and pay in a self-service manner, thus saving the queuing process, and bringing great convenience to the customers.

In existing technologies, intentional or unintentional rule-breaking operations such as a skip-scanning (also called missing scan, either intentional or unintentional) frequently appear when customers use the self-service checkout machine, causing financial loss of retail stores. If assistants are arranged to watch the self-service code scanning of users one by one, manpower and material resources are wasted, which causes extremely high costs to use the self-service checkout machine.

SUMMARY

In view of this, embodiments of this application provide a skip-scanning identification method and apparatus, and a self-service checkout terminal and system to reduce the costs to use self-service checkout terminals.

According to a first aspect, the embodiments of this application provide a skip-scanning identification method, including: obtaining a video of a user scanning an item; determining posture data of the user based on the obtained video; determining, according to the posture data of the user, a time period in which a scanning action of the user takes place; receiving a scanning result of the item; and determining whether the user has skipped scanning the item based on the scanning result and the time period.

In some embodiments, the obtaining a video of a user scanning an item includes: obtaining a video of a code scanning region in which the user is enabled to scan the item.

In some embodiments, determining the posture data of the user includes: determining a first action of the user of moving a hand into a first boundary of the code scanning region; and determining a second action of the user of moving a hand out of a second boundary of the code scanning region; and determining the time period in which a scanning action of the user takes place includes: determining the time period based on a timestamp of the first action of the user and a timestamp of the second action of the user.

In some embodiments, the determining whether the user has skipped scanning the item includes: determining whether an identifier of the item is scanned within the time period based on the scanning result; and determining that the user has skipped scanning the item upon determining that the identifier of the item is not scanned within the time period.

In some embodiments, the determining whether the user has skipped scanning the item includes: obtaining an identifier of the item from the scanning result; retrieving first attribute information of the item based on the obtained identifier; identifying second attribute information of the item according to one or more frames of images of the video within the time period; and determining that the user has skipped scanning the item in response to the first attribute information of the item being inconsistent with the second attribute information of the item.

In some embodiments, the determining whether the user has skipped scanning the item includes: obtaining an identifier of the item from the scanning result; retrieving a price of the item according to the identifier of the item scanned in the time period; identifying a type of the item according to one or more frames of images of the video in the time period; determining a lowest price according to the type; and determining that the user has skipped scanning the item in response to the price of the item being lower than the lowest price.

In some embodiments, the method may further include determining a quantity of items that the user has skipped scanning in response to an operation that the user confirms that scanning of the items is finished; and settling one or more items scanned by the user in response to the quantity of the items that the user has skipped scanning being less than a threshold.

In some embodiments, the method may further include displaying an interface indicating that a settlement is forbidden and/or sending warning information to an on-site monitoring terminal in response to the quantity being not less than the threshold.

In some embodiments, after the displaying an interface indicating a settlement is forbidden, the method further includes: settling the one or more items scanned by the user in response to an operation of an on-site monitoring person associated with the on-site monitoring terminal.

In some embodiments, determining the posture data of the user includes: identifying a hand of the user moving towards a first direction in the video as an action of picking up the item, and identifying a hand of the user moving towards a second direction in the video as an action of scanning the item; and determining the time period in which a scanning action of the user takes place includes: determining the time period based on a timestamp of the action of picking up the item and a timestamp of the action of scanning the item.

In some embodiments, the method may further include sending the obtained video to a back-end monitoring terminal, wherein the video is played by the back-end monitoring terminal.

In some embodiments, the method may further include sending, to the back-end monitoring terminal, a warning instruction for controlling the back-end monitoring terminal to highlight the obtained video of the user upon determining that the user has skipped scanning the item.

In some embodiments, the method may further include obtaining identity information of the user; determining whether the identity information of the user is on a blacklist; and displaying an interface indicating a settlement is forbidden and/or sending warning information to an on-site monitoring terminal in response to the identity information of the user being on the blacklist.

According to other embodiments, a system includes one or more processors and one or more computer-readable memories coupled to the one or more processors and having instructions stored thereon that are executable by the one or more processors to perform the method of any of the preceding embodiments.

The embodiments of this application further provide a computer storage medium, configured to store a computer program. The computer program is executed by a computer to implement the skip-scanning identification method according to any one of the first aspect to the fourth aspect.

In the skip-scanning identification method and apparatus and the self-service checkout terminal and system provided in the embodiments of this application, when a user scans items, video information of the user is acquired, and skip-scanning behavior of the user is detected through the video information. An obtained detection result can be used for implementing functions such as settlement assistance and alarming, to avoid or reduce skip-scanning behavior of the user during use of a self-service checkout terminal, and reduce the financial loss of retail stores, which saves manpower and material resources, effectively reduces the costs to use self-service checkout terminal s, and facilitates the promotion and application of self-service checkout terminal s. In addition, loss prevention is implemented by means of video processing, which prevents the user from being disturbed in a checkout process, thereby effectively improving user experience.

BRIEF DESCRIPTION OF THE DRAWINGS

To describe the technical solutions in the embodiments of this application or in existing technologies more clearly, the following briefly describes the accompanying drawings required for describing the embodiments or existing technologies. Apparently, the accompanying drawings in the following description show some embodiments of this application, and a person of ordinary skill in the art may still derive other drawings from these accompanying drawings without creative efforts.

DETAILED DESCRIPTION

To make the objectives, technical solutions, and advantages of the embodiments of this application clearer, the following clearly and completely describes the technical solutions in the embodiments of this application with reference to the accompanying drawings in the embodiments of this application. Apparently, the described embodiments are merely some embodiments of this application rather than all of the embodiments. All other embodiments obtained by a person of ordinary skill in the art based on the embodiments of this application without creative efforts shall fall within the protection scope of this application.

The terms used in the embodiments of this application are merely for the purpose of illustrating the embodiments, and are not intended to limit this application. The terms "a," "said," and "the" of singular forms used in the embodiments and the appended claims of this application are also intended to include plural forms, unless otherwise specified in the context clearly. The term "a plurality of" generally includes at least two, but not exclude a situation of including at least one.

The term "and/or" used in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Depending on the context, for example, words "if" or "as if" used herein may be explained as "while . . . " or "when . . . " or "in response to determining" or "in response to detection." Similarly, depending on the context, phrases "if determining" or "if detecting (a stated condition or event)" may be explained as "when determining" or "in response to determining" or "when detecting (the stated condition or event)" or "in response to detection (the stated condition or event)."

It should be further noted that the terms "include," "contain," and any variants thereof are intended to cover a non-exclusive inclusion. Therefore, a merchandise or a system that includes a series of elements not only includes such elements, but also includes other elements not specified expressly, or but also includes inherent elements of the merchandise or the system. Unless otherwise specified, an element limited by "include a/an" does not exclude other same elements existing in the merchandise or the system that includes the element.

Figure 1:
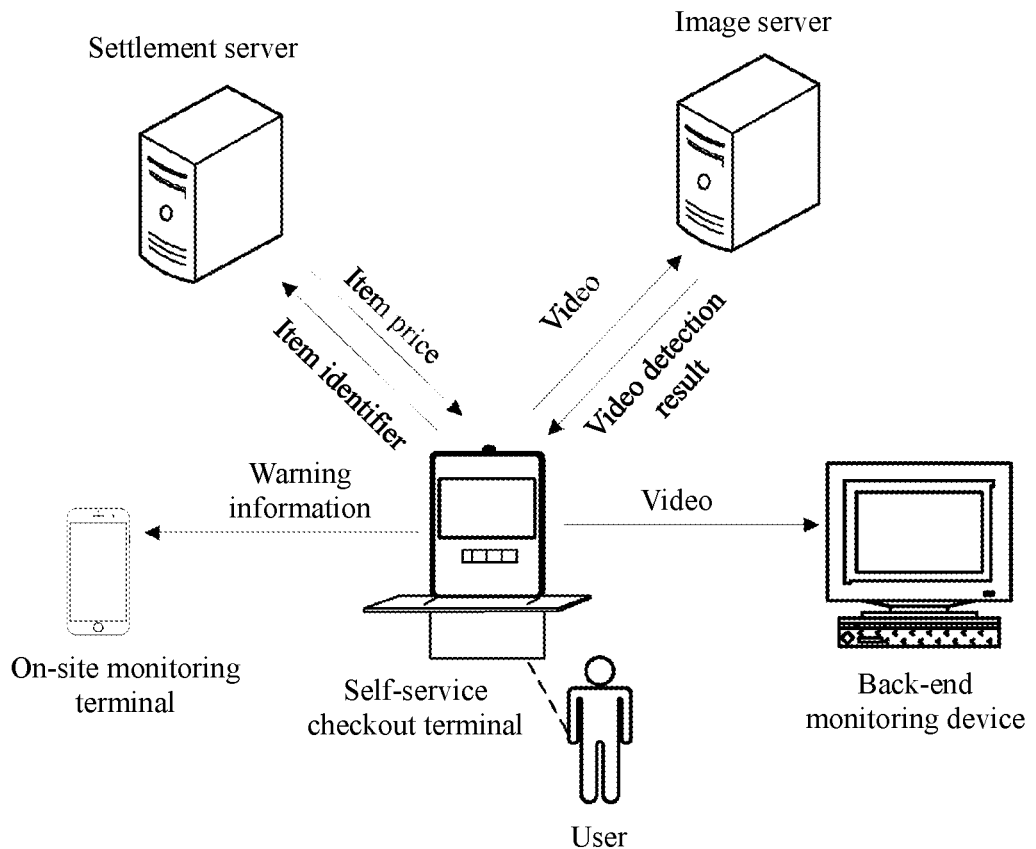
FIG. 1 is a schematic diagram of an application scenario, according to an embodiment of this application.

A method provided in the embodiments of this application is applicable to any cashier scenarios, for example, a supermarket, a shopping mall, a mall, and a store. FIG. 1 is a schematic diagram of an application scenario, according to an embodiment of this application. As shown in FIG. 1, a self-service checkout terminal may communicate with a settlement server, an image server, a back-end monitoring terminal, and an on-site monitoring terminal.

For example, the self-service checkout terminal may be disposed at an exit of a mall or another position. A user may select wanted items in the mall, and then scan barcodes of the items at the self-service checkout terminal. The self-service checkout terminal acquires video information of the user when the user scans the items, and determines whether the user has skip-scanning behavior according to the video information. In this disclosure, the skip-scanning behavior may include both intentional and unintentional behavior.

The settlement server is configured to implement functions such as item searching and settlement. In some embodiments, after the user scans an item at the self-service checkout terminal, the self-service checkout terminal may send an identifier of the scanned item to the settlement server. The settlement server queries for information about the item, such as a name and a price, and sends the information to the self-service checkout terminal. The self-service checkout terminal then displays the information to the user. After the user scans all the items, the settlement server may generate payment information according to prices of all the items and complete settlement according to payment behavior of the user.

The image server is configured to process video information. When the user scans an item, the self-service checkout terminal may acquire in real time video information of the user scanning the item and send the video information to the image server. The image server can process the video information to obtain a detection result of skip-scanning behavior of the user and feedback the detection result to the self-service checkout terminal. The self-service checkout terminal can settle the items scanned by the user according to the detection result.

The back-end monitoring terminal is used for a back-end monitoring person to monitor scanning behavior of the user. The self-service checkout terminal may send the real-time acquired video information of the user scanning the item to the back-end monitoring terminal. The back-end monitoring terminal displays the video information to the back-end monitoring person to implement manual monitoring of user behavior, to further ensure the economic benefits of stores.

The on-site monitoring terminal is used for an on-site monitoring person to monitor scanning behavior of the user. The self-service checkout terminal may send warning information to the on-site monitoring terminal when skip-scanning behavior of the user meets a condition, for example, skip-scanning behavior takes place or a quantity of skipped scans is greater than a value. The on-site monitoring terminal may be carried by the on-site monitoring person. After receiving the warning information, the on-site monitoring person may go to the self-service checkout terminal to assist the user in completing scanning and settlement.

Some embodiments of this application provide a method for processing, during self-service settlement of a user, video information of the user scanning items to obtain a detection result of skip-scanning behavior of the user. The detection result may be used for subsequent steps such as settlement. FIG. 1 shows an application scenario, according to an embodiment of this application. A person skilled in the art may understand that the hardware architecture may be adjusted according to actual requirements as long as skip-scanning behavior of a user can be detected through video information.

For example, the self-service checkout terminal may be provided with functions of the image server, to directly process the video information and obtain a detection result of skip-scanning behavior of the user. The self-service checkout terminal may be further provided with functions of the settlement server. The self-service checkout terminal may store a correspondence between an identifier of an item and an item price, and determine a corresponding price according to an identifier of a scanned item. Alternatively, the functions of the image server and the functions of the settlement server may be integrated in a server. Alternatively, the functions of the image server and the functions of the settlement server may be implemented by the back-end monitoring terminal.

The implementing process of the skip-scanning identification method provided in the embodiments of this application is described in the following with reference to the following method embodiments and accompanying drawings. In addition, the sequence of steps in each method embodiment in the following is merely an example and does not constitute a limitation.

Figure 2:
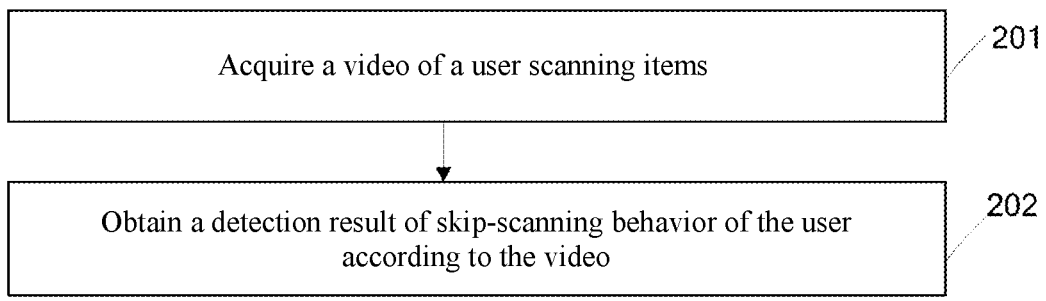
FIG. 2 is a schematic flowchart of Embodiment 1 of a skip-scanning identification method, according to an embodiment of this application.

FIG. 2 is a schematic flowchart of Embodiment 1 of a skip-scanning identification method, according to an embodiment of this application. In this embodiment, the method may be performed by a self-service checkout terminal. As shown in FIG. 2, the skip-scanning identification method in this embodiment may include the following steps.

Step 201: Acquire a video of a user scanning one or more items.

Step 202: Obtain a detection result of skip-scanning behavior of the user according to the video.

The user in this embodiment of this application may be a customer in a retail store. The items may be items to be bought by the user. Generally, there is an identifier such as a barcode or a Quick Response code on an item. The item may be settled by scanning the identifier.

Figure 3:
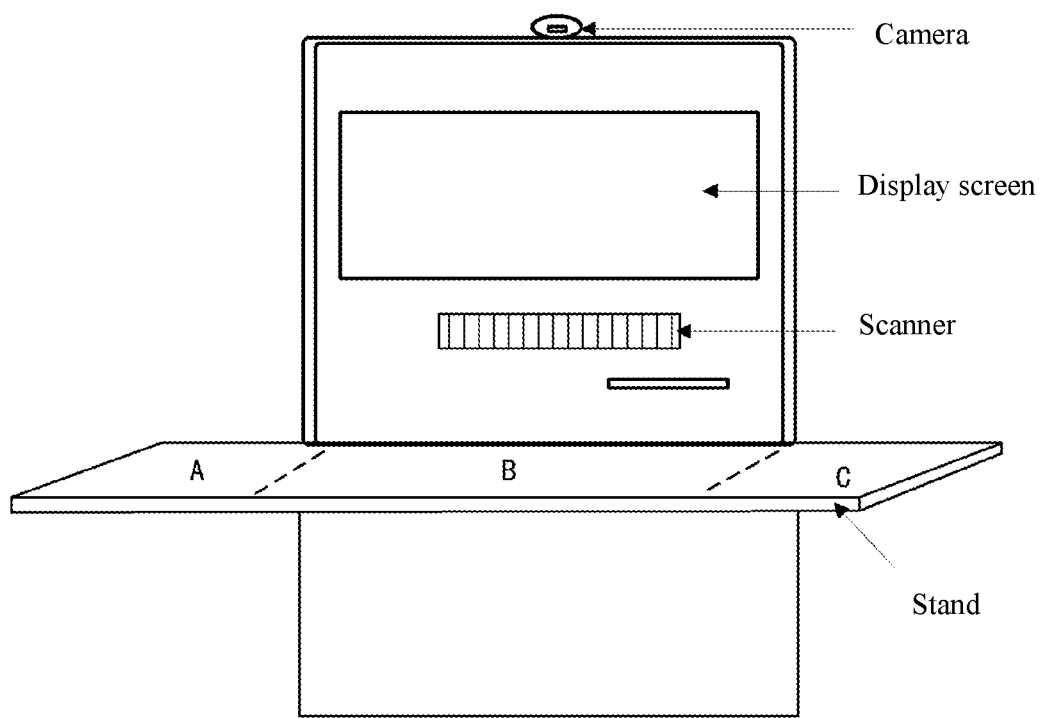
FIG. 3 is a schematic diagram of appearance of a self-service checkout terminal, according to an embodiment of this application.

FIG. 3 is a schematic diagram of an appearance of a self-service checkout terminal, according to an embodiment of this application. As shown in FIG. 3, the self-service checkout terminal may include functional apparatuses such as a camera, a display screen, a scanner, and a stand that are required for self-service checkout. Alternatively, the self-service checkout terminal may not include such functional apparatuses, but instead, the self-service checkout terminal may be embedded in a self-service checkout machine. The self-service checkout machine may include functional apparatuses such as a camera, a display screen, a scanner, and a stand. The self-service checkout terminal implements the skip-scanning identification method through interaction with the functional apparatuses.

The display screen can display information about the items scanned by the user, for example, names and prices of the items. The stand is used for item placement and may include a scan-preparing region A for placing to-be-scanned items, a scanning region B for scanning items, and a scan-finished region C for placing scanned items.

Above the stand is a code scanning region for a user to scan items. The user may align an identifier of an item to the scanner in the code scanning region to scan the item.

A preset range of the code scanning region may be provided with an image-capturing apparatus, for example, a camera shown in FIG. 2. The preset range may be set according to actual requirements, for example, may be set to 1 meter.

Correspondingly, the acquiring a video of a user scanning items in step 201 may include: obtaining a video of the code scanning region acquired by the image-capturing apparatus.

When the user scans the items, the self-service checkout terminal may acquire a video of the user in real time through the camera. The camera may be disposed at a position where item scan behavior of the user can be captured. For example, the camera is disposed on the top of the self-service checkout terminal.

User behavior may be detected according to the video obtained in real time. The detection result may include whether the user has skip-scanning behavior, a quantity of skipped scans of the user, a moment at which skip-scanning behavior of the user is detected each time, or the like. There are a plurality of implementations of obtaining the detection result of skip-scanning behavior of the user according to the video, which is not limited in this embodiment of this application.

In an optional implementation, the user behavior may be analyzed through machine learning. For example, hand models of users and item models are learned through machine learning, and the models are used for real-time skip-scanning detection. For example, a plurality of samples may be obtained at first. Each sample includes behavioral data of a user, for example, motion tracks of hands and postures of hands, and includes corresponding behavior tags, for example, whether the sample belongs to skip-scanning behavior and a quantity of skipped scans. Then a user behavior model is obtained through machine learning, for example, a neural network. During formal opening of the store, behavioral data corresponding to the user may be directly determined according to the video acquired in real time. The behavioral data is inputted into the user behavior model. Whether behavior belongs to skip-scanning behavior or a quantity of skipped scans can be determined according to the model.

There are a plurality of implementations of determining the behavioral data corresponding to the user according to the video. For example, the user behavioral data may be obtained through 3D convolution, an optical flow algorithm, a motion segmentation algorithm, or the like. Through 3D convolution, a plurality of consecutive frames are stacked to form a cube. A 3D convolution kernel is then used in the cube. In such a structure, each feature map in a convolutional layer is connected to a plurality of adjacent consecutive frames in an upper layer. Therefore, motion information can be captured. Currently, the optical flow algorithm is an important method in moving image analysis. When an object moves, a brightness pattern of a point corresponding to the object in an image also moves. The apparent motion of the brightness pattern in the image is an optical flow. Motion segmentation is to mark pixels associated with each independent motion in a plurality of types of motions of sequence features and cluster the pixels according to a media object to which each of the pixels belongs. The main objective is to extract a moving object as foreground from a static background. In addition, a plurality of key points of hands of a user may be obtained through algorithms such as OpenPose. Postures of the hands of the user are determined according to the key points.

In another optional implementation, each item pickup of the user may be considered as a complete action to determine whether there is code scanning behavior during each complete action. If there is no code scanning behavior in a complete action, it is considered that there is a skip-scanning.

The obtaining a detection result of skip-scanning behavior of the user according to the video in step 202 may include: determining posture data of the user according to the video; determining, according to the posture data of the user, a time period in which a scanning action takes place; and determining whether the user has skip-scanning behavior in the time period according to an identifier of an item scanned in the time period.

There are a plurality of implementations of how to capture a complete scanning action and thus determine a time period in which the complete scanning action took place. In some embodiments, the process may start with determining the posture data of the user. The posture data may be determined based on a location trajectory of the user's body part in a plurality of frames extracted from the video.

In some embodiments, the posture data may be obtained by determining the user's hand moving towards a first direction as a first action of picking up the item, and determining the user's hand moving towards a second direction as a second action of scanning the item. Accordingly, Accordingly, the complete scanning action may be determined based on the first action and the second action, and the corresponding time period may be determined based on a timestamp of the first action and a timestamp of the second action. For example, the left side of the self-service checkout terminal is used for placing to-be-scanned items, and the right side is used for placing scanned items. The user's hands moving right is considered as an operation of scanning an item, and moving left is considered as an operation to pick up another item. Moving right and then moving left are considered as a complete action. Alternatively, the posture data may be obtained by determining the user's first action of moving a hand into a first boundary of the code scanning region, and determining the user's second action of moving a hand out of a second boundary of the code scanning region. Accordingly, the complete scanning action may be determined based on the first action and the second action, and the corresponding time period may be determined based on a timestamp of the first action and a timestamp of the second action. For example, the user's hands moving from the left boundary of the scanning region to the right boundary of the scanning region is considered as a complete action. The action is accompanied with code scanning of an item. Otherwise, there is skip-scanning behavior. Alternatively, it can be determined, according to an action trajectory of the user, a moment at which the user picks up an item and a moment at which the user puts down the item. A complete action can be determined according to the moment at which the item is picked up and the moment at which the item is put down.

It can be determined whether there is code scanning behavior through a signal obtained by a code scanning apparatus in the self-service checkout terminal, a point of sale (POS) machine, or another similar device. The POS machine can identify a barcode or a Quick Response code of an item and determine a corresponding name, price, and the like.

In a time period in which an action takes place, if an identifier of an item is not scanned by the POS machine or another scanning apparatus, it is determined that the user has skip-scanning behavior in the time period. Alternatively, if an identifier of an item is scanned, but information about the scanned item is inconsistent with information about the item determined through the video, it may be considered that there is skip-scanning behavior, to prevent the user from cheating by substituting a fake identifier for a true identifier and causing financial loss of a store.

In some embodiments, the determining whether the user has skip-scanning behavior in the time period according to an identifier of an item scanned in the time period may include: identifying attribute information of the item according to one or more frames of images of the video in the time period; determining attribute information of the item according to the identifier of the item scanned in the time period; and determining that the user has skip-scanning behavior if the attribute information identified according to the video is inconsistent with the attribute information determined according to the identifier.

The attribute information of the item may include at least one of the following: a name, a price, a type, a size, a color, and the like of the item.

In some embodiments, the type of the item may be determined according to the video. A price range of the item may be determined according to the type. If a price of the scanned item is not in the range, it is considered that there is skip-scanning behavior. For example, the determining whether the user has skip-scanning behavior in the time period according to an identifier of an item scanned in the time period may include: identifying a type of the item according to one or more frames of images of the video in the time period; determining a corresponding lowest price according to the type; determining a price of the item according to the identifier of the item scanned in the time period; and determining that the user has skip-scanning behavior if the price of the item is lower than the lowest price.

For example, by processing the video, it is found that a start time at which the user scans the first item is 19:00:00, and an end time is 19:00:05. A period of time between 19:00:00 and 19:00:05 is a time period in which a scanning action takes place. In such a time period, if no identifier of the item is scanned, it is considered that there is skip-scanning behavior. If an identifier of the item is scanned, but the item is determined as a chewing gum through the identifier while the item is determined as a large bottle of beverage through the video, or a price of the item is determined as 1 RMB through the identifier while a lowest price of the item is determined as 10 RMB through the video, it indicates that the item information determined through the identifier is inconsistent with the item information detected through the video. As a result, it can be considered that there is skip-scanning behavior.

The attribute information of the item may be identified according to the video through big data analysis, machine learning, and the like.

In this way, through analysis of the video, a time period that a complete action experiences may be determined as well as item information in the video. In the time period, whether an item is scanned and information about a scanned item can be determined through the POS machine or the like, to determine whether the user has skip-scanning behavior.

After the video is detected, the items scanned by the user may be further settled according to the detection result. If the detection result meets a preset condition, the items scanned by the user may be settled. The user may leave away with the items after completing payment as normal. If the preset condition is not met, settlement on the items is forbidden. The preset condition may be set according to actual requirements.

In an optional implementation, as long as it is detected that the user has skip-scanning behavior, settlement on the items is forbidden. Only when no skip-scanning behavior occurs in the entire scanning process, can the user perform settlement normally.

In another optional implementation, as long as the quantity of skipped scans of the user is less than a value, the user is allowed to settle the items scanned by the user, which allows a video detection algorithm to be fault-tolerant, thereby preventing misjudgment affecting the shopping experience of the user, and shortening a shopping process.

In some embodiments, the settling the items scanned by the user according to the detection result may include: determining a quantity of skipped scans of the user according to the detection result in response to an operation event that the user confirms that all the items are scanned; and settling the items scanned by the user if the quantity of skipped scans of the user is less than a first preset threshold.

The operation event that the user confirms that all the items are scanned may refer to an operation of confirming that all the items are scanned in a manner, such as clicking/tapping on a screen, pressing a key, or voice input. For example, a "Done" button may be displayed on the self-service checkout terminal. After scanning all the items, the user may click/tap the "Done" button. The self-service checkout terminal settles the items scanned by the user according to the detection result in response to the clicking/tapping operation of the user.

If the quantity of skipped scans of the user is not less than the first preset threshold, settlement on the items is forbidden. The first preset threshold may be set according to actual requirements, for example, may be 4.

When the settlement on the items is forbidden, corresponding measures, for example, displaying a settlement-forbidden interface, may be taken to inform the user. The settlement-forbidden interface is used for informing the user that settlement is forbidden. In some embodiments, the settlement-forbidden interface may display "It has been detected that you have skip-scanning behavior. Settlement is forbidden," or may display "You have skip-scanning behavior. Please ask an assistant to deal with the situation," or the like.

In an actual application, a self-service checkout terminal acquires video of a user when the user scans items, and detects user behavior according to the video to determine whether the user has skip-scanning behavior. When the user behavior meets a condition, for example, no skip-scanning behavior occurs or a quantity of skipped scans of the user is less than a preset frequency, is the user allowed to pay normally. Otherwise, payment behavior of the user may be obstructed to prevent the skip-scanning of the user from causing loss of a store.

In addition, the method for detecting whether a user has skip-scanning behavior through a video recording of the user or the scanning area in this embodiment of this application is apparently progressive as compared with a method of performing settlement based on a weighing apparatus in existing technologies.

In existing technologies, a self-service checkout terminal is provided with a weighing machine to prevent loss by weighing through a gravity sensor. A weight corresponding to a code-scanned item is compared with a weight of the item on the weighing machine. If the two weights are different, an alarm is emitted to implement loss prevention by weighing. The machine occupies a large space, and each item needs to be weighed, causing poor user experience. In the skip-scanning identification method provided in this embodiment of this application, the function of loss prevention is implemented through video processing, which is not perceived by a user, and reduces the interference to the user. Therefore, the user is not interfered with during checkout, which can improve user experience, and save space for a store. The method has a wider scope of application and better flexibility.

Based on the above, in the skip-scanning identification method provided in this embodiment, when a user scans items, a video of the user is acquired, and skip-scanning behavior of the user is detected through the video. An obtained detection result can be used for implementing functions such as settlement assistance and alarming, to avoid or reduce skip-scanning behavior of the user during use of a self-service checkout terminal, and reduce the financial loss of retail stores, which saves manpower and material resources, effectively reduces the costs to use self-service checkout terminal s, and facilitates the promotion and application of self-service checkout terminals. In addition, loss prevention is implemented by means of video processing, which prevents the user from being disturbed in a checkout process, thereby effectively improving user experience.

Figure 4:
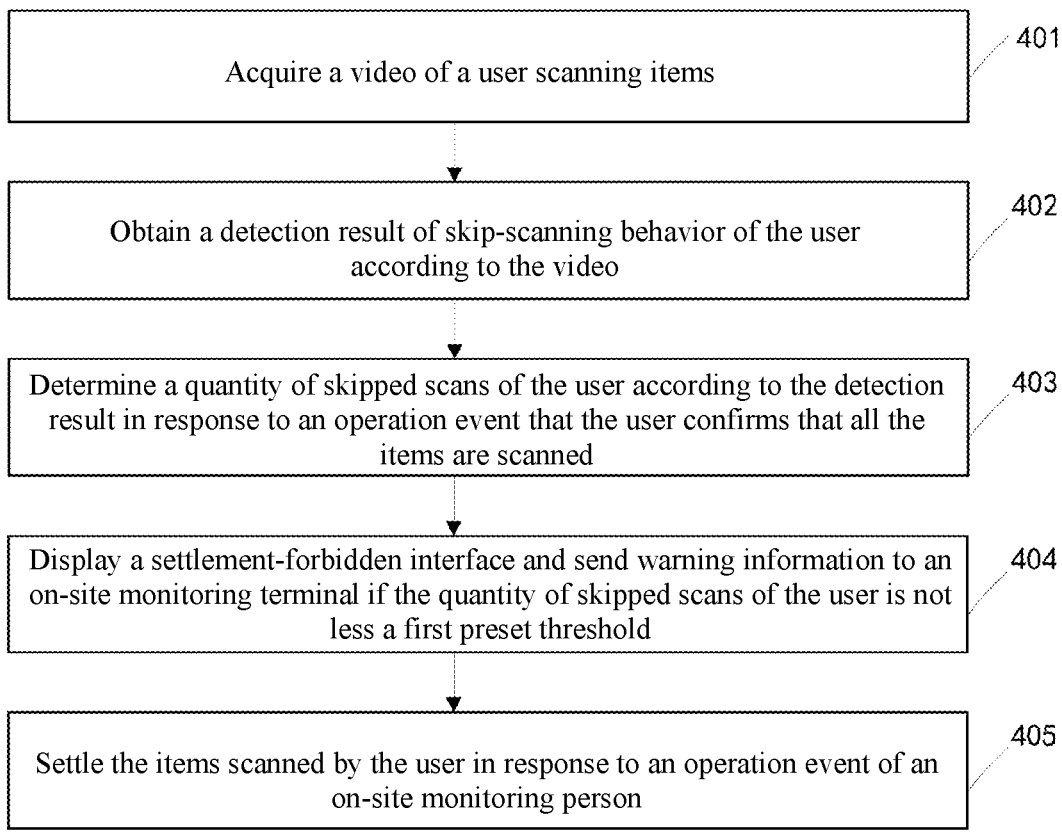
FIG. 4 is a schematic flowchart of Embodiment 2 of a skip-scanning identification method, according to an embodiment of this application.

FIG. 4 is a schematic flowchart of Embodiment 2 of a skip-scanning identification method, according to an embodiment of this application. This embodiment is based on the technical solution provided in the foregoing embodiment. When a user has skip-scanning behavior, an on-site monitoring person in a store may be prompted to deal with the situation. As shown in FIG. 4, the skip-scanning identification method in this embodiment may include the following steps.

Step 401: Acquire a video of a user scanning items.

Step 402: Obtain a detection result of skip-scanning behavior of the user according to the video.

Step 403: Determine a quantity of skipped scans of the user according to the detection result in response to an operation event that the user confirms that all the items are scanned.

In some embodiments, the items scanned by the user are settled if the quantity of skipped scans of the user is less than a first preset threshold.

Step 404: Display a settlement-forbidden interface and send warning information to an on-site monitoring terminal if the quantity of skipped scans of the user is not less than a first preset threshold.

If the quantity of skipped scans of the user is greater than or equal to the first preset threshold, settlement on the user may be obstructed. The settlement-forbidden interface is displayed, and the warning information may be further sent to the on-site monitoring terminal to alert an on-site monitoring person.

The on-site monitoring terminal may be any terminal, for example a mobile phone or a wearable device such as a watch or a smart band, carried by the on-site monitoring person. The on-site monitoring person may be a person such as a store assistant for assisting the user in completing self-service checkout on site.

After receiving the warning information, the on-site monitoring terminal may push alert information to the on-site monitoring person according to the warning information to prompt the on-site monitoring person to deal with the situation. For example, "Checkout No. xx detects skip-scanning behavior. Please go to deal with it" may be displayed or played.

In another optional implementation, only the settlement-forbidden interface is displayed and the warning information is not sent. The user actively asks the on-site monitoring person for help.

Step 405: Settle the items scanned by the user in response to an operation event of the on-site monitoring person.

After receiving the warning information, the on-site monitoring person may go to the self-service checkout terminal where the user is located to assist the user with settlement.

For example, if the on-site monitoring person finds that the items to be bought by the user are completely consistent with the items scanned by the user and displayed on the self-service checkout terminal, the on-site monitoring person may lift the obstruction to allow the user to pay normally. If the on-site monitoring person finds that the items to be bought by the user are inconsistent with the items scanned by the user and displayed on the self-service checkout terminal, it indicates that the user has skip-scanning behavior. In this case, the on-site monitoring person may assist the user in completing the scanning. After all the items are correctly scanned, the on-site monitoring person lifts the obstruction to allow the user to pay normally.

There are a plurality of manners for lifting the obstruction. For example, the on-site monitoring person may input a password on the self-service checkout terminal to lift the obstruction.

In some embodiments, the settling the items scanned by the user in response to an operation event of the on-site monitoring person in step 405 may include: obtaining a password inputted by the on-site monitoring person, and settling the items scanned by the user if the password is a password used for lifting settlement forbiddance.

Alternatively, the on-site monitoring terminal carried by the on-site monitoring person may be provided with a Quick Response (QR) code. When the on-site monitoring person confirms that the user has correctly scanned all the items, the on-site monitoring person may scan the QR code by using the self-service checkout terminal to lift the obstruction.

Correspondingly, the settling the items scanned by the user in response to an operation event of the on-site monitoring person in step 405 may include: scanning a QR code provided by the on-site monitoring person, and settling the items scanned by the user if the QR code is a QR code for lifting settlement forbiddance.

In other optional implementations, the obstruction may be alternatively lifted in the following manners: the self-service checkout terminal captures a particular expression of the on-site monitoring person, the on-site monitoring person inputs a particular key word in a voice input manner, other interaction is performed between the on-site monitoring terminal and the self-service checkout terminal, and the like, which is not limited in this embodiment.

In the skip-scanning identification method provided in this embodiment, after a user scans all items, a quantity of skipped scans is determined according to a detection result. If the quantity of skipped scans of the user meets a condition, a settlement-forbidden interface may be displayed and warning information may be sent to an on-site monitoring terminal to inform an on-site monitoring person to deal with the situation. After the on-site monitoring person assists the user in completing the scanning, a self-service checkout terminal settles the items scanned by the user in response to an operation event of the on-site monitoring person. Therefore, for a problem during the scanning of the user, the on-site monitoring person can be informed timely to assist the user, thereby improving the efficiency of self-service checkout of the user and effectively avoiding the financial loss of stores.

Figure 5:
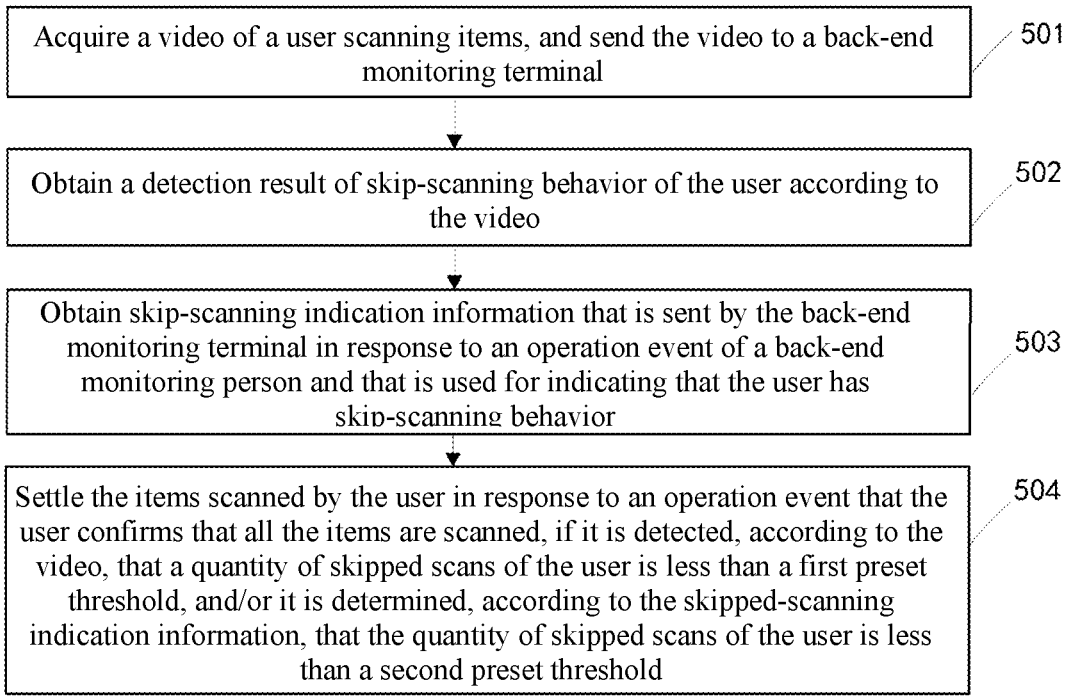
FIG. 5 is a schematic flowchart of Embodiment 3 of a skip-scanning identification method, according to an embodiment of this application.

FIG. 5 is a schematic flowchart of Embodiment 3 of a skip-scanning identification method, according to an embodiment of this application. This embodiment is based on the technical solutions provided in the foregoing embodiments. When user behavior is monitored through a self-service checkout terminal, the user behavior is also monitored by a back-end monitoring terminal. As shown in FIG. 5, the skip-scanning identification method in this embodiment may include the following steps.

Step 501: Acquire a video of a user scanning items, and send the video to a back-end monitoring terminal.

The video of a user scanning items may be acquired in real time and sent to the back-end monitoring terminal in real time. The video is played by the back-end monitoring terminal, for a back-end monitoring person to monitor user behavior according to the video.

The back-end monitoring person may be a member of staff for video surveillance in a store. The back-end monitoring terminal may be any terminal with a video playing function such as a mobile phone, a tablet device, a computer, a smart TV, or a display.

Step 502: Obtain a detection result of skip-scanning behavior of the user according to the video.

Step 503: Obtain skip-scanning indication information that is sent by the back-end monitoring terminal in response to an operation event of a back-end monitoring person and that is used for indicating that the user has skip-scanning behavior.

In step 502, the video may be processed through an algorithm to detect skip-scanning behavior of the user, which is machine detection behavior. In step 503, the back-end monitoring person may operate correspondingly when finding that the user has skip-scanning behavior, which is a manual monitoring manner.

In some embodiments, after the back-end monitoring terminal receives the video of the user scanning the items that is sent by a self-service checkout terminal, the video may be displayed to the back-end monitoring person, for the back-end monitoring person to determine, according to the video, whether the user has skip-scanning behavior. In response to an operation event that the back-end monitoring person confirms that the user has skip-scanning behavior, the back-end monitoring terminal may send the skip-scanning indication information to the self-service checkout terminal, for the self-service checkout terminal to settle the items scanned by the user according to the skip-scanning indication information.

There are a plurality of implementations of the operation event that the back-end monitoring person confirms that the user has skip-scanning behavior. For example, a "Problem" button may be displayed in a video playing interface of the back-end monitoring terminal. When the back-end monitoring person finds that the user has skip-scanning behavior according to a surveillance picture (the video of the user), the back-end monitoring person may press the "Problem" button, for the back-end monitoring terminal to send the skip-scanning indication information to the self-service checkout terminal. Alternatively, the back-end monitoring person may confirm that the user has skip-scanning behavior in manners such as voice or keypress.

Step 504: Settle the items scanned by the user in response to an operation event that the user confirms that all the items are scanned, if it is detected, according to the video, that a quantity of skipped scans of the user is less than a first preset threshold, and/or it is determined, according to the skip-scanning indication information, that the quantity of skipped scans of the user is less than a second preset threshold.

In this embodiment, the self-service checkout terminal may detect skip-scanning behavior of the user in two ways. One is to process the video through an algorithm to determine a quantity of skipped scans of the user. The other is that the back-end monitoring person monitors user behavior through the video to determine a quantity of skipped scans of the user.

When the user confirms that all the items are scanned, it can be determined, according to the quantity of skipped scans obtained by the algorithm and/or the quantity of skipped scans obtained through manual monitoring, whether the items scanned by the user are allowed to be settled.

In an optional implementation, step 504 may include: settling the items scanned by the user in response to the operation event that the user confirms that all the items are scanned, if it is detected, according to the video, that the quantity of skipped scans of the user is less than the first preset threshold; and performing obstruction if the quantity of skipped scans of the user is not less than the first preset threshold.

In an optional implementation, step 504 may include: settling the items scanned by the user in response to the operation event that the user confirms that all the items are scanned, if it is determined, according to the skip-scanning indication information, that the quantity of skipped scans of the user is less than the second preset threshold; and performing obstruction if the quantity of skipped scans of the user is not less than the second preset threshold.

In some embodiments, the back-end monitoring person may click/tap "Problem" once to send one piece of skip-scanning indication information to the self-service checkout terminal each time finding that the user has skip-scanning behavior. The self-service checkout terminal may determine the quantity of skipped scans of the user according to a quantity of pieces of receiving skip-scanning indication information received during the scanning of the user.

If the quantity of skipped scans of the user determined by the back-end monitoring person is less than the second preset threshold, the user is allowed to perform settlement normally. The second preset threshold may be set according to actual requirements, for example, may be 2.

In another optional implementation, step 504 may include: settling the items scanned by the user in response to the operation event that the user confirms that all the items are scanned, if it is detected, according to the video, that the quantity of skipped scans of the user is less than the first preset threshold, and it is determined, according to the skip-scanning indication information, that the quantity of skipped scans of the user is less than the second preset threshold; and performing obstruction if it is detected, according to the video, that the quantity of skipped scans of the user is not less than the first preset threshold or it is determined, according to the skip-scanning indication information, that the quantity of skipped scans of the user is not less than the second preset threshold.

For example, the user is allowed to perform settlement normally only when the quantity of skipped scans obtained by processing the video is less than 4 times and the quantity of skipped scans of the user determined by the back-end monitoring person is less than 2 times. The settlement is forbidden if the quantity of skipped scans obtained by processing the video is not less than 4 times or the quantity of skipped scans of the user determined by the back-end monitoring person is not less than 2 times.

In another optional implementation, step 504 may include: settling the items scanned by the user in response to the operation event that the user confirms that all the items are scanned, if it is detected, according to the video, that the quantity of skipped scans of the user is less than the first preset threshold or it is determined, according to the skip-scanning indication information, that the quantity of skipped scans of the user is less than the second preset threshold; and performing obstruction if it is detected, according to the video, that the quantity of skipped scans of the user is not less than the first preset threshold and it is determined, according to the skip-scanning indication information, that the quantity of skipped scans of the user is not less than the second preset threshold.

In the foregoing implementations, reference may be made to the foregoing embodiments for manners of implementing obstruction, for example, may include displaying a settlement-forbidden interface and sending warning information to an on-site monitoring terminal.

Based on the above, in the skip-scanning identification method provided in this embodiment of this application, a self-service checkout terminal may process acquired video and detect skip-scanning behavior of a user, and may send the acquired video to a back-end monitoring terminal. The video is played by the back-end monitoring terminal, for a back-end monitoring person to monitor user behavior according to the real-time acquired video and provide feedback to the self-service checkout terminal when finding that the user has skip-scanning behavior. After the user confirms that all items are scanned, the self-service checkout terminal may determine, according to a quantity of skipped scans detected through the video or a quantity of skipped scans determined according to information fed back by the back-end monitoring person, whether a normal settlement process is to be performed. The method can implement manual monitoring and algorithm-based monitoring, which improves the effect of loss prevention.

In some embodiments, when there are a plurality of self-service checkout terminals in a store, the back-end monitoring terminal may communicate with the plurality of self-service checkout terminals, to obtain a video captured by the plurality of self-service checkout terminals, and display the video to the back-end monitoring person.

Further, the self-service checkout terminal may send, to the back-end monitoring terminal, a warning instruction for controlling the back-end monitoring terminal to highlight the video of the user if it is detected through the video that the user has skip-scanning behavior.

The self-service checkout terminal may process the video to detect skip-scanning behavior of the user in real time, and send the warning instruction to the back-end monitoring terminal if it is detected that the user has skip-scanning behavior. After receiving the warning instruction, the back-end monitoring terminal may highlight the video of the user according to the warning instruction.

For example, a plurality of pieces of video are displayed in a display interface of the back-end monitoring terminal. When a self-service checkout terminal detects that a user has skip-scanning behavior, the self-service checkout terminal may send the warning information to the back-end monitoring terminal. The back-end monitoring terminal may highlight the video acquired by the self-service checkout terminal.

There are a plurality of highlighting manners, as long as the video of skip-scanning behavior can be distinguished from other videos to make it convenient for the back-end monitoring person to focus on possible users with problems. In some embodiments, a name, a number, a region of the video may be highlighted, or a warning identifier such as a red point or an exclamation mark may be added in the video.

In this way, when it is detected through the video that the user has skip-scanning behavior, an operation of a suspected user may be highlighted on the back-end monitoring terminal, to prompt the back-end monitoring person to perform second-time confirmation with a monitoring target, thereby improving the monitoring efficiency, and reducing retailing consumption.

Further, the back-end monitoring terminal may further cancel the highlighting of the video in response to an operation event that the back-end monitoring person checks the highlighted video. For example, the back-end monitoring person may check the video by clicking the mouse. The back-end monitoring terminal may cancel the highlighting of the video when detecting that the back-end monitoring person checks the video, to avoid that a long-time highlighted state of the video affects the monitoring efficiency of the back-end monitoring person.

Based on the technical solutions provided in the foregoing embodiments, In some embodiments, step 502 may include: obtaining the detection result of skip-scanning behavior of the user obtained by processing the video by the back-end monitoring terminal.

For example, the video may be detected by the back-end monitoring terminal to lighten the burden of the self-service checkout terminal. The back-end monitoring terminal may process the video to detect skip-scanning behavior of the user, and send the detection result of skip-scanning behavior of the user to the self-service checkout terminal, making it convenient for the self-service checkout terminal to perform settlement by using the detection result.

It may be understood that when the video is detected by the back-end monitoring terminal, when detecting through the video that the user has skip-scanning behavior, the back-end monitoring terminal may directly highlight corresponding video without the self-service checkout terminal, improving the system processing efficiency.

Figure 6:
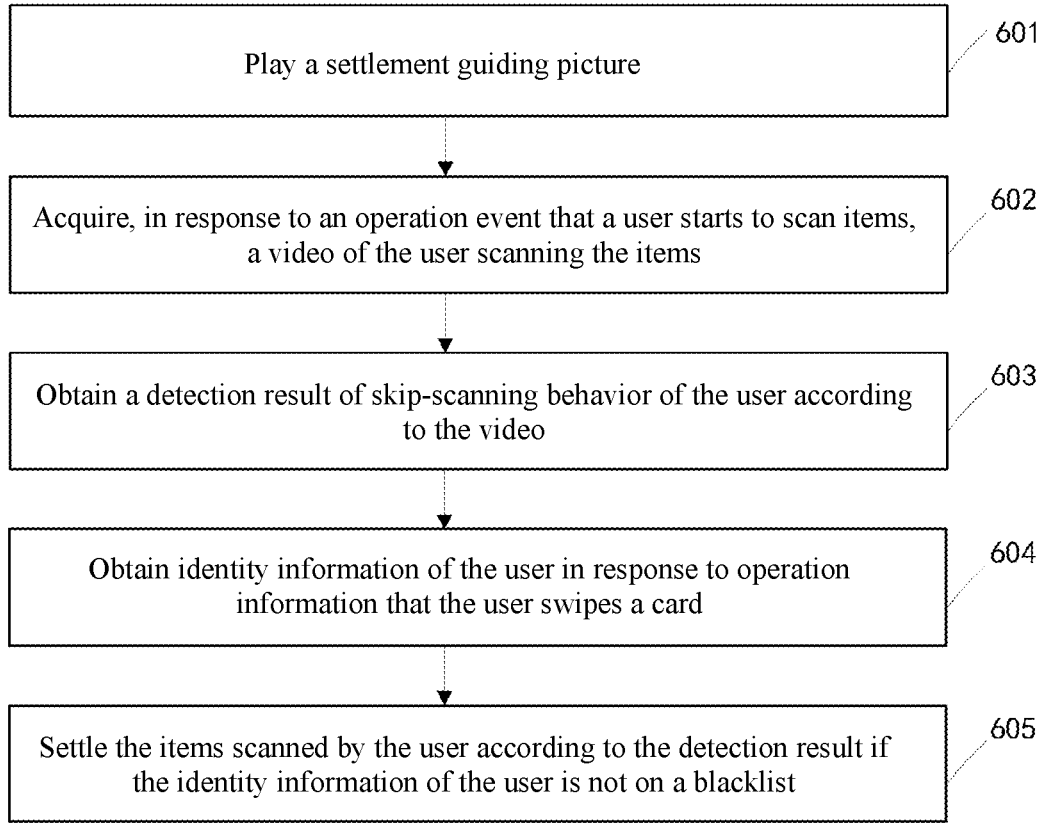
FIG. 6 is a schematic flowchart of Embodiment 4 of a skip-scanning identification method, according to an embodiment of this application.

FIG. 6 is a schematic flowchart of Embodiment 4 of a skip-scanning identification method, according to an embodiment of this application. Based on the technical solutions provided in the foregoing embodiments, functions such as a settlement guiding picture and a blacklist mechanism are added in this embodiment. If a user is on a blacklist, the user cannot use a self-service checkout terminal to perform settlement. As shown in FIG. 6, the skip-scanning identification method in this embodiment may include the following steps.

Step 601: Play a settlement guiding picture. Before a user starts to scan items, a self-service checkout terminal may play a settlement guiding picture to inform the user to perform self-service code scanning and settlement. The settlement guiding picture may be a static image, a video, or an animation. The settlement guiding picture may include content for guiding the user to correctly perform a settlement operation, for example, how to correctly pick up items, and how to perform a code scanning operation.

Step 602: Acquire, in response to an operation event that the user starts to scan the items, a video of the user scanning the items. In this embodiment, the function of video acquisition may be disabled until the user starts to scan the items. Only when the user starts to scan the items, then is the function of video acquisition enabled to acquire a video of the user scanning the items. After the video starts to be acquired, skip-scanning identification may be performed in real time according to an algorithm.

In an actual application, the user may confirm the start of the item scanning in a plurality of manners. In some embodiments, an option, a key, or the like of a start operation may be provided for the user to select. For example, a "Start" button is displayed on the settlement guiding picture. In response to an operation event that the user clicks/taps the "Start" button, the video of the user scanning the items may start to be acquired. Alternatively, after the user successfully picks up and scans an item, the video of the user scanning the items starts to be acquired.

Step 603: Obtain a detection result of skip-scanning behavior of the user according to the video.

Step 604: Obtain identity information of the user in response to operation information that the user swipes a card.

After scanning all the items, the user may perform settlement by swiping the card. The card herein may refer to a membership card of a store, or any card that can identify the user. The identity information of the user may refer to a name, a membership number, a phone number, an identity card number, and the like of the user.

In other implementations, the identity information of the user may be obtained in manners such as facial recognition, scanning a QR code on a user terminal, or the like.

Step 605: Settle the items scanned by the user according to the detection result if the identity information of the user is not on a blacklist.

The blacklist may be stored in the self-service checkout terminal. Alternatively, the blacklist may be stored in another device such as a server or a back-end monitoring terminal and obtained through communication with the another device.

If the identity information of the user is on the blacklist, the user is forbidden to perform settlement on the self-service checkout terminal. For example, a settlement-forbidden interface may be displayed to inform the user that "Abnormal. Please go to the staffed counter for settlement."

In another optional implementation, if the identity information of the user can be obtained in advance, scanning behavior of the user may be obstructed timely. For example, the identity information of the user may be obtained through the facial recognition technology. If the identity information of the user is on the blacklist, the user may be informed "Abnormal. Please go to the staffed counter for settlement" before the user starts to scan the items or when the user scans the item.

Further, the back-end monitoring terminal may be configured to implement the function of adding to a blacklist. In some embodiments, the back-end monitoring terminal may add the identity information of the user to a suspect blacklist in response to an operation event of a back-end monitoring person; display the identity information on the suspect blacklist and the corresponding video to a manager; and add the identity information of the user to a blacklist in response to an operation event of the manager.

When monitoring the video, the back-end monitoring person may add the identity information of the user to the suspect blacklist according to user behavior. For example, the back-end monitoring terminal may display a button "Add to the blacklist" in an interface playing the video of the user. In response to an operation that the back-end monitoring person clicks/taps the button, the identity information of the user may be added to the suspect blacklist.

Then the manager of the store may check the user on the suspect blacklist. The back-end monitoring terminal may play the video of the user on the suspect blacklist to the manager. The manager determines whether the user is to be added to the blacklist. If the manager confirms that the user has abnormal behavior, the manager may click/tap a corresponding button in the video playing interface. The back-end monitoring terminal may add the identity information of the user to the blacklist.

The identity information added to the blacklist is public to the whole network, or public to all chain stores so that the user cannot perform self-service settlement and payment in any of the chain stores.

Based on the above, in the skip-scanning identification method provided in this embodiment, a blacklist function is added. After a user scans all items, if the user is not on a blacklist and skip-scanning behavior of the user meets a preset condition, payment can be performed normally. If the user is on the blacklist, the user is not allowed to perform self-service settlement or payment, thereby effectively ensuring the economic benefits of stores.

Based on the technical solutions provided in the foregoing embodiments, In some embodiments, corresponding prompt information may be further pushed to a user according to a detected quantity of skipped scans of the user.

When the user scans items, when it is detected that the user has skip-scanning behavior, prompt information corresponding to a current quantity of skipped scans may be pushed. For example, a quantity of skipped scans greater than 0 and less than 3 corresponds to first-class prompt information, and a quantity of skipped scans greater than or equal to 3 corresponds to second-class prompt information. The first-class prompt information may be a weak prompt. The second-class prompt information may be a strong prompt to enhance the prompt effect to the user.

For example, the first-class prompt information may be "Dear, please make sure that the quantity of scanned items matches the quantity of actual items." The second-class prompt information may be "Do you have problems in scanning? Ask the assistant to help you."

Besides, a "Help" button may be further displayed. In response to an operation that the user presses the "Help" button, prompt information may be sent to an on-site monitoring terminal to prompt an on-site monitoring person to provide assistance and deal with the situation.

Based on the technical solutions provided in the foregoing embodiments, In some embodiments, a video and a data logs may be further uploaded to a server, for the server to optimize algorithms, report statistics, and the like according to the video and the data logs.

Figure 7:
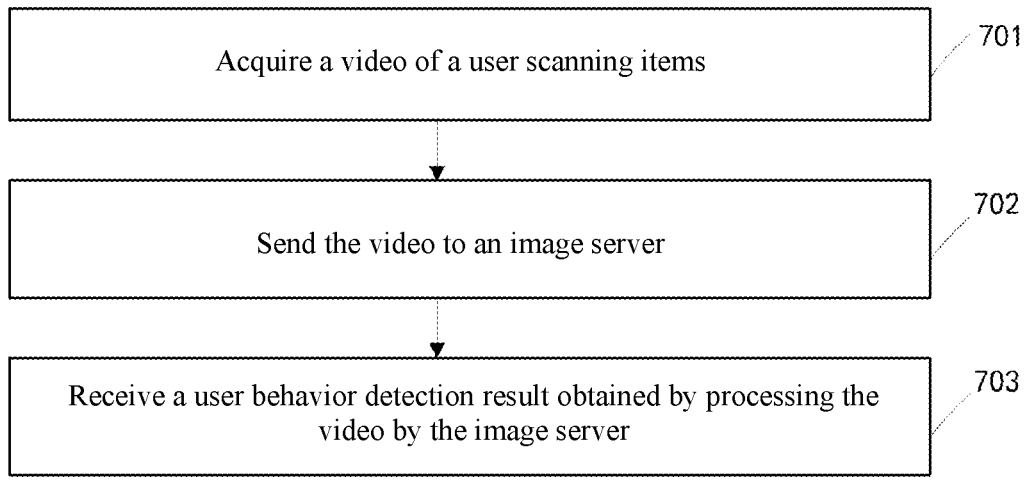
FIG. 7 is a schematic flowchart of Embodiment 5 of a skip-scanning identification method, according to an embodiment of this application.

FIG. 7 is a schematic flowchart of Embodiment 5 of a skip-scanning identification method, according to an embodiment of this application. In this embodiment, the method may be performed by a self-service checkout terminal. The difference between this embodiment and the foregoing embodiments is that the video is processed by an image server. As shown in FIG. 7, the skip-scanning identification method in this embodiment may include the following steps.

Step 701: Acquire a video of a user scanning items.

Step 702: Send the video to an image server.

Step 703: Receive a user behavior detection result obtained by processing the video by the image server.

In some embodiments, the user behavior detection result includes time information corresponding to a scanning action of the user. The time information includes at least one of the following: a start time, an end time, and a time period in which the action takes place. A self-service checkout terminal determines whether there is skip-scanning behavior according to a detection result of the scanning action of the user.

Correspondingly, after the receiving a user behavior detection result obtained by processing the video by the image server, the method further includes: determining whether the user has skip-scanning behavior according to an identifier of an item scanned in a time period in which the scanning action takes place.

Alternatively, the user behavior detection result may include a detection result of skip-scanning behavior of the user that is obtained according to the video and a scanning result of an item, for example, may include whether the user has skip-scanning behavior, times of skip-scanning behavior, and the like.

The method may further include: sending the scanning result of the item to the image server, for the image server to obtain the detection result of skip-scanning behavior of the user according to the video and the scanning result. Correspondingly, the user behavior detection result includes the detection result of skip-scanning behavior of the user.

The scanning result includes at least one of the following: an identifier of the item, attribute information of the item, a time at which the item is scanned, and the like.

Figure 8:
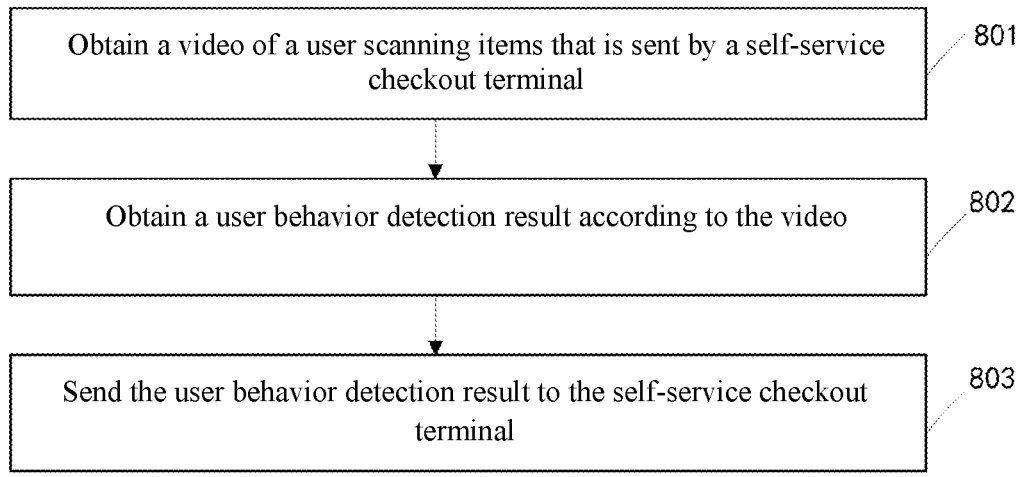
FIG. 8 is a schematic flowchart of Embodiment 6 of a skip-scanning identification method, according to an embodiment of this application.

FIG. 8 is a schematic flowchart of Embodiment 6 of a skip-scanning identification method, according to an embodiment of this application. In this embodiment, the method may be performed by an image server. As shown in FIG. 8, the skip-scanning identification method in this embodiment may include the following steps.

Step 801: Obtain a video of a user scanning items that is sent by a self-service checkout terminal.

Step 802: Obtain a user behavior detection result according to the video.

Step 803: Send the user behavior detection result to the self-service checkout terminal.

In some embodiments, the obtaining a user behavior detection result according to the video may include: determining posture data of the user according to the video; and determining time information corresponding to a scanning action according to the posture data of the user, where the time information includes at least one of the following: a start time, an end time, and a time period in which the action takes place. The user behavior detection result includes the time information.

In some embodiments, the method may further include: receiving a scanning result of an item that is sent by the self-service checkout terminal; and obtaining a detection result of skip-scanning behavior of the user according to the video and the scanning result, where the user behavior detection result includes the detection result of skip-scanning behavior of the user.

In some embodiments, the obtaining a detection result of skip-scanning behavior of the user according to the video and the scanning result may include: identifying attribute information of the item according to the video; determining attribute information of the item according to the scanning result of the item; and determining that the user has skip-scanning behavior if the attribute information of the item identified according to the video is inconsistent with the attribute information of the item determined according to the scanning result.

In some embodiments, the obtaining a detection result of skip-scanning behavior of the user according to the video and the scanning result may include: identifying a type of the item according to the video; determining a corresponding lowest price according to the type; determining a price of the item according to the scanning result of the item; and determining that the user has skip-scanning behavior if the price of the item is lower than the lowest price.

The only difference between Embodiments 5 and 6 and the foregoing embodiments lies in that video is processed by an image server. Reference may be made to the foregoing embodiments for an implementation principle, process, and effect. Details are not repeated herein.

Figure 9:
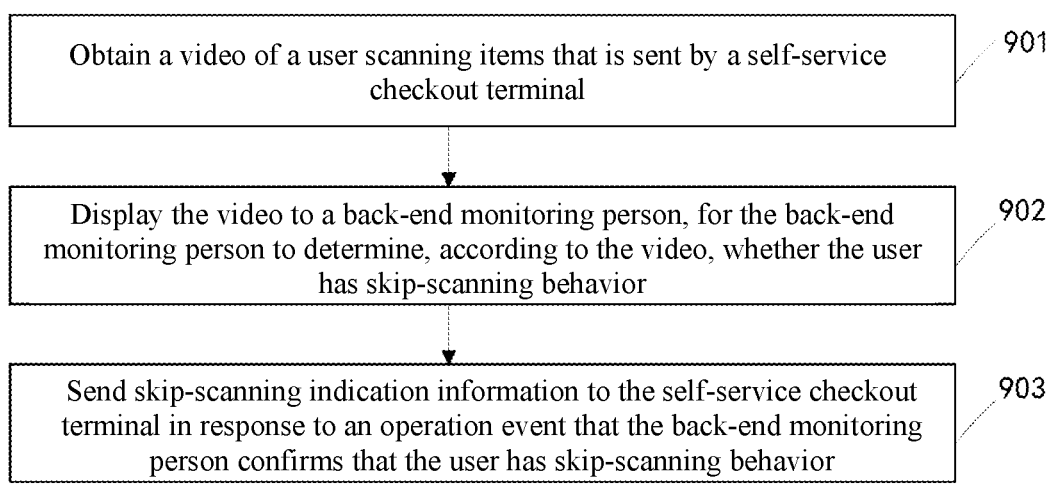
FIG. 9 is a schematic flowchart of Embodiment 7 of a skip-scanning identification method, according to an embodiment of this application.

FIG. 9 is a schematic flowchart of Embodiment 7 of a skip-scanning identification method, according to an embodiment of this application. In this embodiment, the method may be performed by a back-end monitoring terminal. As shown in FIG. 9, the skip-scanning identification method in this embodiment may include the following steps.

Step 901: Obtain video information of a user scanning items that is sent by a self-service checkout terminal.

Step 902: Display the video information to a back-end monitoring person, for the back-end monitoring person to determine, according to the video information, whether the user has skip-scanning behavior.

Step 903: Send skip-scanning indication information to the self-service checkout terminal in response to an operation event that the back-end monitoring person confirms that the user has skip-scanning behavior.

In some embodiments, the method may further include: obtaining a warning instruction sent by the self-service checkout terminal when the self-service checkout terminal detects that the user has skip-scanning behavior; and highlighting the video information of the user according to the warning instruction.

In some embodiments, the method may further include: processing the video information, to detect skip-scanning behavior of the user; and sending a detection result of skip-scanning behavior of the user to the self-service checkout terminal.

In some embodiments, the method may further include: adding identity information of the user to a suspect blacklist in response to an operation event of the back-end monitoring person; display the identity information on the suspect blacklist and the corresponding video information to a manager; and adding the identity information of the user to a blacklist in response to an operation event of the manager.

The implementation principle and process of the skip-scanning identification method provided in this embodiment are similar to those of the foregoing embodiments. For a part that is not described in this embodiment in detail, reference may be made to the foregoing embodiments. For the execution process and technical effect of this technical solution, reference may be made to the description of the foregoing embodiments. Details are not repeated herein.

One or more embodiments of a skip-scanning identification apparatus of this application are described in detail in the following. A person skilled in the art may understand that all the skip-scanning identification apparatuses can be formed by configuring market-selling hardware components through steps instructed in this solution.

Figure 10:
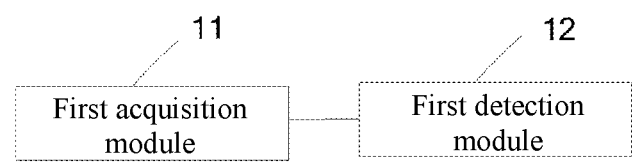
FIG. 10 is a schematic structural diagram of Embodiment 1 of a skip-scanning identification apparatus, according to an embodiment of this application.

FIG. 10 is a schematic structural diagram of Embodiment 1 of a skip-scanning identification apparatus, according to an embodiment of this application. As shown in FIG. 10, the apparatus may include: a first acquisition module 11, configured to acquire video information of a user scanning items; and a first detection module 12, configured to obtain a detection result of skip-scanning behavior of the user according to the video information.

In some embodiments, the apparatus may further include a settlement module, configured to settle the items scanned by the user according to the detection result.

In some embodiments, an image-capturing apparatus is disposed in a preset range of a code scanning region for the user to scan the items; and correspondingly, the first acquisition module 11 may be configured to obtain video information of the code scanning region acquired by the image-capturing apparatus.

In some embodiments, the first detection module 12 may be configured to: determine posture data of the user according to the video information; determine, according to the posture data of the user, a time period in which a scanning action takes place; and determine whether the user has skip-scanning behavior in the time period according to an identifier of an item scanned in the time period.

In some embodiments, the first detection module 12 may be configured to: determine posture data of the user according to the video information; determine, according to the posture data of the user, a time period in which a scanning action takes place; identify attribute information of the item according to one or more frames of images of the video information in the time period; determine attribute information of the item according to the identifier of the item scanned in the time period; and determine that the user has skip-scanning behavior if the attribute information identified according to the video information is inconsistent with the attribute information determined according to the identifier.

In some embodiments, the first detection module 12 may be configured to: determine posture data of the user according to the video information; determine, according to the posture data of the user, a time period in which a scanning action takes place; identify a type of the item according to one or more frames of images of the video information in the time period; determine a corresponding lowest price according to the type; determine a price of the item according to the identifier of the item scanned in the time period; and determine that the user has skip-scanning behavior if the price of the item is lower than the lowest price.

In some embodiments, the settlement module may be configured to: determine a quantity of skipped scans of the user according to the detection result in response to an operation event that the user confirms that all the items are scanned; and settle the items scanned by the user if the quantity of skipped scans of the user is less than a first preset threshold.

In some embodiments, the settlement module may be further configured to display a settlement-forbidden interface and/or send warning information to an on-site monitoring terminal if the quantity of skipped scans of the user is not less than the first preset threshold.

In some embodiments, the settlement module may be further configured to settle the items scanned by the user in response to an operation event of an on-site monitoring person after the settlement-forbidden interface is displayed.

In some embodiments, the settlement is further configured to: obtain a password inputted by the on-site monitoring person after the settlement-forbidden interface is displayed, and settle the items scanned by the user if the password is a password used for lifting settlement forbiddance; or scan a QR code provided by the on-site monitoring person, and settle the items scanned by the user if the QR code is a QR code for lifting settlement forbiddance.

In some embodiments, the first acquisition module 11 may be further configured to send the acquired video information to a back-end monitoring terminal, where the video information is played by the back-end monitoring terminal.

In some embodiments, the first detection module 12 may be further configured to send, to the back-end monitoring terminal, a warning instruction for controlling the back-end monitoring terminal to highlight the video information of the user if it is detected through the video information that the user has skip-scanning behavior.

In some embodiments, the settlement module 13 may be configured to: obtain skip-scanning indication information that is sent by the back-end monitoring terminal in response to an operation event of a back-end monitoring person and that is used for indicating that the user has skip-scanning behavior; and settle the items scanned by the user in response to an operation event that the user confirms that all the items are scanned, if it is detected, according to the video information, that a quantity of skipped scans of the user is less than a first preset threshold, and/or it is determined, according to the skip-scanning indication information, that the quantity of skipped scans of the user is less than a second preset threshold.

In some embodiments, the first detection module 12 may be configured to: process the video information, to detect skip-scanning behavior of the user; or obtain the detection result of skip-scanning behavior of the user obtained by processing the video information by the back-end monitoring terminal.

In some embodiments, the settlement module 13 may be configured to: obtain identity information of the user; determine whether the identity information of the user is on a blacklist; and settle the items scanned by the user according to the detection result if the identity information of the user is not on the blacklist.

In some embodiments, the first detection module 12 may be further configured to push corresponding prompt information to the user according to a detected quantity of skipped scans of the user.

The apparatus shown in FIG. 10 may perform the skip-scanning identification methods provided in the foregoing Embodiments 1 to 4. For a part that is not described in this embodiment in detail, reference may be made to the foregoing embodiments. For the execution process and technical effect of this technical solution, reference may be made to the description of the foregoing embodiments. Details are not repeated herein.

Figure 11:
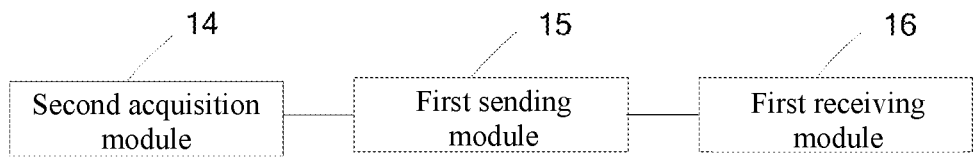
FIG. 11 is a schematic structural diagram of Embodiment 2 of a skip-scanning identification apparatus, according to an embodiment of this application.

FIG. 11 is a schematic structural diagram of Embodiment 2 of a skip-scanning identification apparatus, according to an embodiment of this application. As shown in FIG. 11, the apparatus may include: a second acquisition module 14, configured to acquire video information of a user scanning items; a first sending module 15, configured to send the video information to an image server; and a first receiving module 16, configured to receive a user behavior detection result obtained by processing the video information by the image server.

In some embodiments, the user behavior detection result includes time information corresponding to a scanning action of the user, where the time information includes at least one of the following: a start time, an end time, and a time period in which the action takes place.

Correspondingly, the first receiving module 16 may be further configured to determine, after receiving the user behavior detection result obtained by processing the video information by the image server, whether the user has skip-scanning behavior according to an identifier of an item scanned in a time period in which the scanning action takes place.

In some embodiments, the first receiving module 16 may be further configured to send a scanning result of an item to the image server, for the image server to obtain the detection result of skip-scanning behavior of the user according to the video information and the scanning result. Correspondingly, the user behavior detection result includes the detection result of skip-scanning behavior of the user.

The apparatus shown in FIG. 11 may perform the skip-scanning identification method provided in the foregoing Embodiment 5. For a part that is not described in this embodiment in detail, reference may be made to the foregoing embodiments. For the execution process and technical effect of this technical solution, reference may be made to the description of the foregoing embodiments. Details are not repeated herein.

Figure 12:
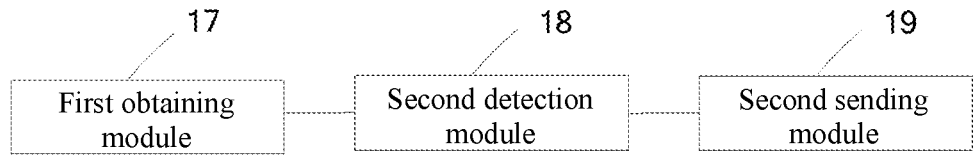
FIG. 12 is a schematic structural diagram of Embodiment 3 of a skip-scanning identification apparatus, according to an embodiment of this application.

FIG. 12 is a schematic structural diagram of Embodiment 3 of a skip-scanning identification apparatus, according to an embodiment of this application. As shown in FIG. 12, the apparatus may include: a first obtaining module 17, configured to obtain video information of a user scanning items that is sent by a self-service checkout terminal; a second detection module 18, configured to obtain a user behavior detection result according to the video information; and a second sending module 19, configured to send the user behavior detection result to the self-service checkout terminal.

In some embodiments, the second detection module 18 may be configured to determine posture data of the user according to the video information; and determine time information corresponding to a scanning action according to the posture data of the user, where the time information includes at least one of the following: a start time, an end time, and a time period in which the action takes place. The user behavior detection result includes the time information.

In some embodiments, the second detection module 18 may be configured to: receive a scanning result of an item that is sent by the self-service checkout terminal; and obtain a detection result of skip-scanning behavior of the user according to the video information and the scanning result, where the user behavior detection result includes the detection result of skip-scanning behavior of the user.

In some embodiments, the second detection module 18 may be configured to: receive a scanning result of an item that is sent by the self-service checkout terminal; identify attribute information of the item according to the video information; determine attribute information of the item according to the scanning result of the item; and determine that the user has skip-scanning behavior if the attribute information of the item identified according to the video information is inconsistent with the attribute information of the item determined according to the scanning result.

In some embodiments, the second detection module 18 may be configured to: receive a scanning result of an item that is sent by the self-service checkout terminal; identify a type of the item according to the video information; determine a corresponding lowest price according to the type; determine a price of the item according to the scanning result of the item; and determine that the user has skip-scanning behavior if the price of the item is lower than the lowest price.

The apparatus shown in FIG. 12 may perform the skip-scanning identification method provided in the foregoing Embodiment 6. For a part that is not described in this embodiment in detail, reference may be made to the foregoing embodiments. For the execution process and technical effect of this technical solution, reference may be made to the description of the foregoing embodiments. Details are not repeated herein.

Figure 13:
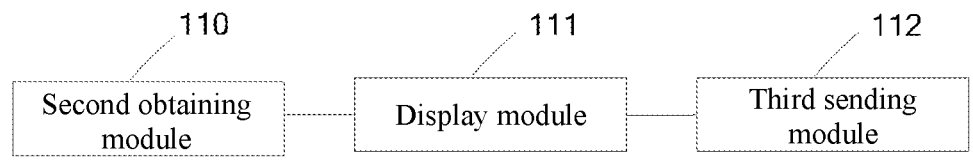
FIG. 13 is a schematic structural diagram of Embodiment 4 of a skip-scanning identification apparatus, according to an embodiment of this application.

FIG. 13 is a schematic structural diagram of Embodiment 4 of a skip-scanning identification apparatus, according to an embodiment of this application. As shown in FIG. 13, the apparatus may include: a second obtaining module 110, configured to obtain video information of a user scanning items that is sent by a self-service checkout terminal; a display module 111, configured to display the video information to a back-end monitoring person, for the back-end monitoring person to determine, according to the video information, whether the user has skip-scanning behavior; and a third sending module 112, configured to send skip-scanning indication information to the self-service checkout terminal in response to an operation event that the back-end monitoring person confirms that the user has skip-scanning behavior.

In some embodiments, the third sending module 112 may be further configured to: obtain a warning instruction sent by the self-service checkout terminal when the self-service checkout terminal detects that the user has skip-scanning behavior; and highlight the video information of the user according to the warning instruction.

In some embodiments, the third sending module 112 may be further configured to: process the video information, to detect skip-scanning behavior of the user; and send a detection result of skip-scanning behavior of the user to the self-service checkout terminal.

In some embodiments, the third sending module 112 may be further configured to: add identity information of the user to a suspect blacklist in response to an operation event of the back-end monitoring person; display the identity information on the suspect blacklist and the corresponding video information to a manager; and add the identity information of the user to a blacklist in response to an operation event of the manager.

The apparatus shown in FIG. 13 may perform the skip-scanning identification method provided in the foregoing Embodiment 7. For a part that is not described in this embodiment in detail, reference may be made to the foregoing embodiments. For the execution process and technical effect of this technical solution, reference may be made to the description of the foregoing embodiments. Details are not repeated herein.

Figure 14:
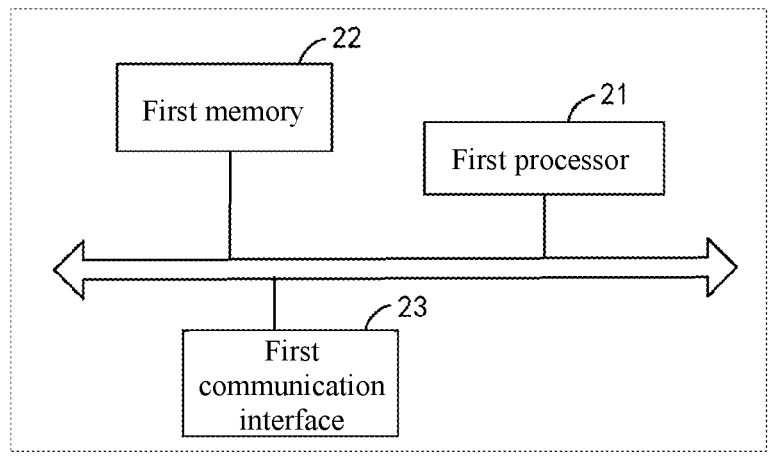
FIG. 14 is a schematic structural diagram of a self-service checkout terminal, according to an embodiment of this application.

FIG. 14 is a schematic structural diagram of a self-service checkout terminal, according to an embodiment of this application. As shown in FIG. 14, the self-service checkout terminal may include: a first processor 21 and a first memory 22. The first memory 22 is configured to store a program that supports the self-service checkout terminal in performing any of the skip-scanning identification methods provided in the foregoing embodiments. The first processor 21 is configured to execute the program stored in the first memory 22.

The program includes one or more computer instructions, and the one or more computer instructions, when executed by the first processor 21, can implement the following steps: acquiring video information of a user scanning items; obtaining a detection result of skip-scanning behavior of the user according to the video information.

In some embodiments, the first processor 21 may be further configured to perform all or some of steps of the foregoing embodiments shown in FIG. 1 to FIG. 4.

The structure of the self-service checkout terminal may further include a first communication interface 23 for the self-service checkout terminal to communicate with another device or a communication network.

The self-service checkout terminal in this embodiment may be used as a part of a self-service checkout machine in a store, for example, may be integrated inside the self-service checkout machine in the store, and connected to a display apparatus, a POS machine, and the like of the self-service checkout machine to implement corresponding functions.

Alternatively, the self-service checkout terminal may include a display apparatus, a POS machine, and the like. The self-service checkout terminal provided with such apparatuses can independently implement the self-service checkout function without another device connected thereto.

Figure 15:
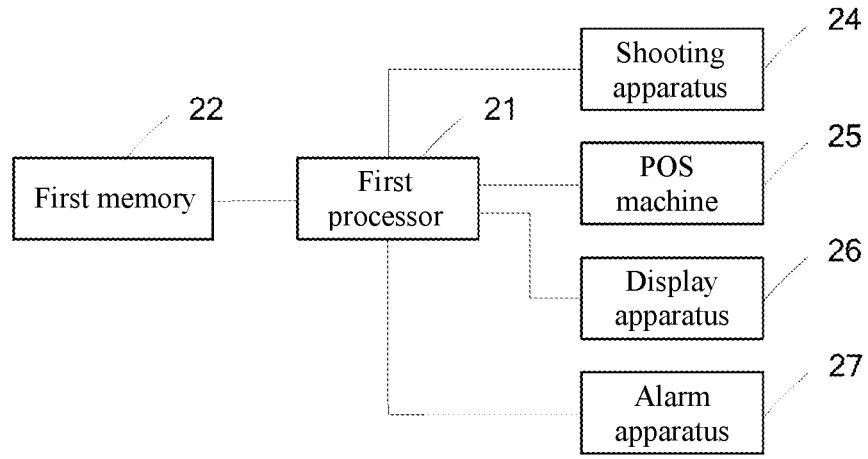
FIG. 15 is a schematic structural diagram of another self-service checkout terminal, according to an embodiment of this application.

FIG. 15 is a schematic structural diagram of another self-service checkout terminal, according to an embodiment of this application. Based on the self-service checkout terminal shown in FIG. 14, apparatuses configured to assist the first processor 21 in working are added to the self-service checkout terminal shown in FIG. 15.

In some embodiments, in addition to the first processor 21 and the first memory 22, the self-service checkout terminal may further include an image-capturing apparatus 24 connected to the first processor. The image-capturing apparatus 24 may be a camera or the like. The image-capturing apparatus 24 is configured to acquire video information of a user scanning items and send the video information to the first processor 21. In other words, the first processor 21 may acquire, through the image-capturing apparatus 24, video information of a user scanning items.

In some embodiments, the self-service checkout terminal may further include: a stand (not shown in the figure). The stand includes a scan-preparing region for placing to-be-scanned items, a scanning region for scanning items, and a scan-finished region for placing scanned items. The scan-preparing region, the scanning region, and the scan-finished region are all within a shooting region of the image-capturing apparatus 24.

In some embodiments, the self-service checkout terminal may further include: a POS machine 25 and a display apparatus 26. Both the POS machine 25 and the display apparatus 26 are connected to the first processor 21. The POS machine 25 is configured to scan and settle items.

The display apparatus 26 is configured to display a settlement guiding picture before a user starts to scan items; display, when the user is scanning an item, information about the scanned item; and display a settlement interface or a settlement-forbidden interface after the user completes the scanning. The display apparatus 26 may display corresponding pictures or information under the control of the first processor 21.

Correspondingly, the first processor 21 may implement operations such as scanning, settlement, display, and the like through the POS machine 25, the display apparatus 26, and the like. For example, that the first processor 21 settles the items may include that the first processor 21 settles the items through the POS machine 25; and that the first processor 21 displays a settlement-forbidden interface may include that the first processor 21 displays the settlement-forbidden interface through the display apparatus 26.

In other optional implementations, the first processor 21 may alternatively implement scanning and settlement in other manners. For example, the items may be scanned through a barcode scanning apparatus or a QR code scanning apparatus. A price of a scanned item may be determined through communication with a database, to settle the item. A payment function may be implemented through a payment interface such as Alipay.

In some embodiments, the self-service checkout terminal may further include an alarm apparatus 27. The alarm apparatus 27 is connected to the first processor 21 and is configured to obtain alarm indication information sent by the first processor 21 when the first processor 21 detects that skip-scanning behavior of a user does not meet a preset condition, and send an alarm signal according to the alarm indication information. The preset condition may be set according to actual requirements, for example, may be that a quantity of skipped scans is less than a value.

The alarm apparatus 27 may include at least one of the following: an indicator light, a vibrator, a speaker, and the like. The alarm signal sent by the alarm apparatus may include at least one of the following: flickering of the indicator light, vibration of the vibrator, and an alarm signal played by the speaker.

The image-capturing apparatus 24, the stand, the POS machine 25, the display apparatus 26, the alarm apparatus 27, and the like are integrated in the self-service checkout terminal shown in FIG. 15, which can assist the first processor 21 in completing the self-service settlement operation. The structure of the self-service checkout terminal is simple, easy to operate, and suitable for promotion and application.

Figure 16:
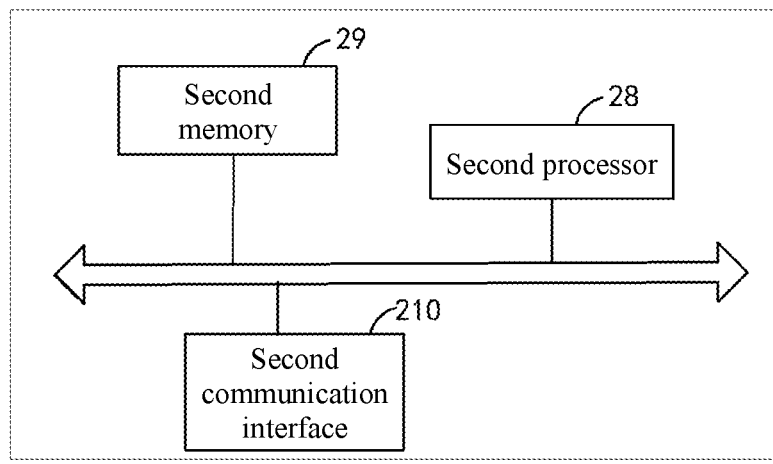
FIG. 16 is a schematic structural diagram of still another self-service checkout terminal, according to an embodiment of this application.

FIG. 16 is a schematic structural diagram of still another self-service checkout terminal, according to an embodiment of this application. As shown in FIG. 16, the self-service checkout terminal may include: a second processor 28 and a second memory 29. The second memory 29 is configured to store a program that supports the self-service checkout terminal in performing any of the skip-scanning identification methods provided in the foregoing embodiments. The second processor 28 is configured to execute the program stored in the second memory 29.

The program includes one or more computer instructions, and the one or more computer instructions, when executed by the second processor 28, can implement the following steps: acquiring video information of a user scanning items; sending the video information to an image server; and receiving a user behavior detection result obtained by processing the video information by the image server.

The structure of the self-service checkout terminal may further include a second communication interface 210 for the self-service checkout terminal to communicate with another device or a communication network.

Figure 17:
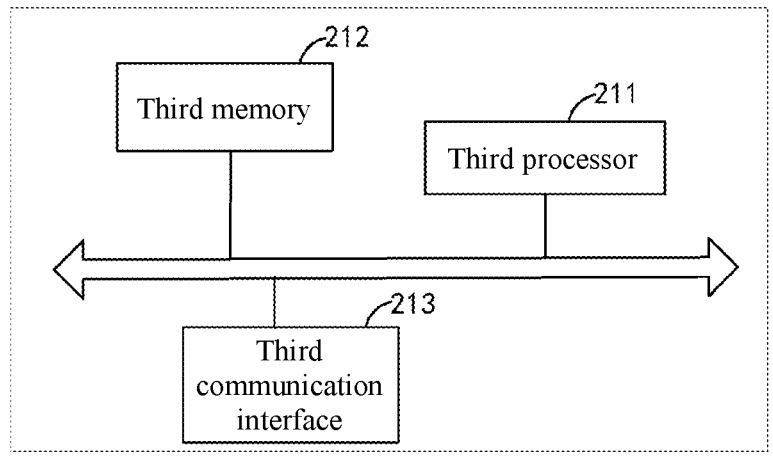
FIG. 17 is a schematic structural diagram of an image server, according to an embodiment of this application.

FIG. 17 is a schematic structural diagram of an image server, according to an embodiment of this application. As shown in FIG. 17, the image server may include a third processor 211 and a third memory 212. The third memory 212 is configured to store a program that supports the image server in performing any of the skip-scanning identification methods provided in the foregoing embodiments. The third processor 211 is configured to execute the program stored in the third memory 212.

The program includes one or more computer instructions, and the one or more computer instructions, when executed by the third processor 211, can implement the following steps: obtaining video information of a user scanning items that is sent by a self-service checkout terminal; obtaining a user behavior detection result according to the video information; and sending the user behavior detection result to the self-service checkout terminal.

The structure of the image server may further include a third communication interface 213 for the image server to communicate with another device or a communication network.

Figure 18:
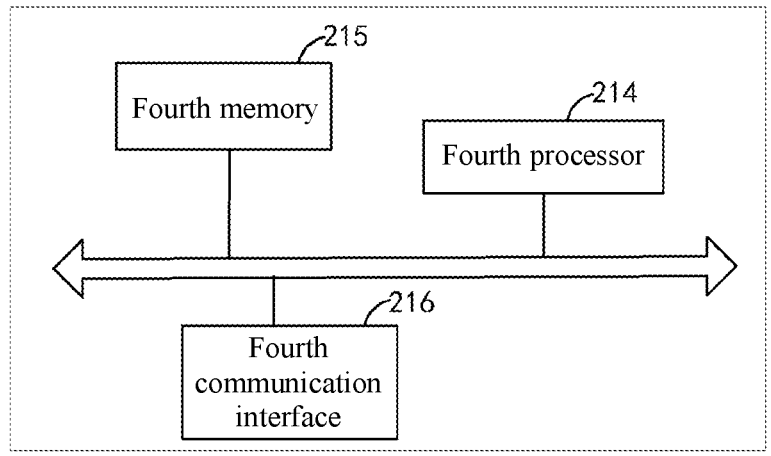
FIG. 18 is a schematic structural diagram of a back-end monitoring terminal, according to an embodiment of this application.

FIG. 18 is a schematic structural diagram of a back-end monitoring terminal, according to an embodiment of this application. As shown in FIG. 18, the back-end monitoring terminal may include a fourth processor 214 and a fourth memory 215. The fourth memory 214 is configured to store a program that supports the back-end monitoring terminal in performing any of the skip-scanning identification methods provided in the foregoing embodiments. The fourth processor 214 is configured to execute the program stored in the fourth memory 215.

The program includes one or more computer instructions, and the one or more computer instructions, when executed by the fourth processor 214, can implement the following steps: obtaining video information of a user scanning items that is sent by a self-service checkout terminal; displaying the video information to a back-end monitoring person, for the back-end monitoring person to determine, according to the video information, whether the user has skip-scanning behavior; and sending skip-scanning indication information to the self-service checkout terminal in response to an operation event that the back-end monitoring person confirms that the user has skip-scanning behavior.

The structure of the back-end monitoring terminal may further include a fourth communication interface 216 for the back-end monitoring terminal to communicate with another device or a communication network.

The embodiments of this application further provide a self-service checkout system. The self-service checkout system may include the self-service checkout terminal described in any of the foregoing embodiments and the back-end monitoring terminal described in any of the foregoing embodiments, and may further include the image server described in any of the foregoing embodiments.

In some embodiments, the self-service checkout system may further include an on-site monitoring terminal. The on-site monitoring terminal is configured to obtain warning information sent by the self-service checkout terminal when the self-service checkout terminal detects that a quantity of skipped scans of a user is not less than a first preset threshold, and push alert information to an on-site monitoring person according to the warning information.

In some embodiments, the on-site monitoring terminal may be a wearable device. The on-site monitoring terminal may be provided with a QR code for lifting settlement forbiddance and being scanned by the self-service checkout terminal.

In some embodiments, the self-service checkout system may further include a back-end server. The self-service checkout terminal may upload video information, data logs, and the like to the back-end server, for the back-end server to optimize algorithms.

For the working principle, execution process, and technical effect of the system provided in this embodiment of this application, reference may be made to any of the foregoing embodiments. Details are not repeated herein.

In addition, the embodiments of this application provide a computer-readable storage medium that stores computer instructions. When executed by a processor, the computer instructions cause the processor to perform the following actions: acquiring video information of a user scanning items; and obtaining a detection result of skip-scanning behavior of the user according to the video information.

When executed by the processor, the computer instructions can further cause the processor to perform all or some of steps involved in the skip-scanning identification methods provided in the foregoing Embodiments 1 to 4.

In addition, the embodiments of this application provide another computer-readable storage medium that stores computer instructions. When executed by a processor, the computer instructions cause the processor to perform the following actions: acquiring video information of a user scanning items; sending the video information to an image server; and receiving a user behavior detection result obtained by processing the video information by the image server.

When executed by the processor, the computer instructions can further cause the processor to perform all or some of steps involved in the skip-scanning identification method provided in the foregoing Embodiment 5.

In addition, the embodiments of this application provide another computer-readable storage medium that stores computer instructions. When executed by a processor, the computer instructions cause the processor to perform the following actions: obtaining video information of a user scanning items that is sent by a self-service checkout terminal; obtaining a user behavior detection result according to the video information; and sending the user behavior detection result to the self-service checkout terminal.

When executed by the processor, the computer instructions can further cause the processor to perform all or some of steps involved in the skip-scanning identification method provided in the foregoing Embodiment 6.

In addition, the embodiments of this application provide still another computer-readable storage medium that stores computer instructions. When executed by a processor, the computer instructions cause the processor to perform the following actions: obtaining video information of a user scanning items that is sent by a self-service checkout terminal; displaying the video information to a back-end monitoring person, for the back-end monitoring person to determine, according to the video information, whether the user has skip-scanning behavior; and sending skip-scanning indication information to the self-service checkout terminal in response to an operation event that the back-end monitoring person confirms that the user has skip-scanning behavior.

In addition, when executed by the processor, the computer instructions can further cause the processor to perform all or some of steps involved in the skip-scanning identification method provided in the foregoing Embodiment 7.

The foregoing described device embodiments are merely examples. The units described as separate parts may or may not be physically separate, and the parts displayed as units may or may not be physical units, may be located in one position, or may be distributed on a plurality of network units. Some or all of the modules may be selected according to actual needs to implement the objectives of the solutions of the embodiments. A person of ordinary skill in the art may understand and implement the solutions without creative efforts.

Through the description of the foregoing implementations, a person skilled in the art may clearly understand that the implementations may be implemented by a necessary universal hardware platform, or in a manner by combining hardware and software. Based on such an understanding, the foregoing technical solutions essentially or the part contributing to existing technologies may be implemented in a form of a computer product. This application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to the embodiments of this application. It should be understood that computer program instructions can implement each procedure and/or block in the flowcharts and/or block diagrams and a combination of procedures and/or blocks in the flowcharts and/or block diagrams. These computer program instructions may be provided to a general-purpose computer, a special-purpose computer, an embedded processor, or a processor of another programmable network connection device to generate a machine, so that an apparatus configured to implement functions specified in one or more procedures in the flowcharts and/or one or more blocks in the block diagrams is generated by using instructions executed by the general-purpose computer or the processor of another programmable network connection device.

These computer program instructions may also be stored in a computer-readable memory that can guide a computer or another programmable network connection device to work in a particular manner, so that the instructions stored in the computer-readable memory generate a product including an instruction apparatus, where the instruction apparatus implements functions specified in one or more procedures in the flowcharts and/or one or more blocks in the block diagrams.

These computer program instructions may also be loaded into a computer or another programmable network connection device, so that a series of operation steps are performed on the computer or another programmable data processing device to generate processing implemented by a computer, and instructions executed on the computer or another programmable data processing device provide steps for implementing functions specified in one or more procedures in the flowcharts and/or one or more blocks in the block diagrams.

In a typical configuration, the computer device includes one or more processors (CPUs), an input/output interface, a network interface, and a memory.

The internal memory may include the following forms of computer-readable media: a non-persistent memory, a random access memory (RAM), and/or a non-volatile internal memory, for example, a read-only memory (ROM) or a flash memory (flash RAM). The internal memory is an example of the computer-readable medium.

The computer-readable medium includes a persistent medium and a non-persistent medium, a removable medium and a non-removable medium, which may implement storage of information by using any method or technology. The information may be computer-readable instructions, a data structure, a module of a program, or other data. Examples of a storage medium of a computer includes, but is not limited to, a phase change memory (PRAM), a static random access memory (SRAM), a dynamic random access memory (DRAM), or other types of random access memory (RAM), a read-only memory (ROM), an erasable programmable read-only memory (EEPROM), a flash memory or another storage technology, a compact disc read-only memory (CD-ROM), a digital versatile disc (DVD) or another optical storage, or a cartridge tape. A magnetic storage of a magnetic tape or a disc, another magnetic storage device, or any other non-transmission medium may be configured to store information that can be accessed by a computing device. Based on the definition in this specification, the computer-readable medium does not include transitory computer-readable media (transitory media), such as a modulated data signal and a carrier.

Finally, it should be noted that the foregoing embodiments are merely used for describing the technical solutions of this application, but are not intended to limit this application. It should be understood by a person of ordinary skill in the art that although this application has been described in detail with reference to the foregoing embodiments, modifications can be made to the technical solutions described in the foregoing embodiments, or equivalent replacements can be made to some technical features in the technical solutions. As long as such modifications or replacements do not cause the essence of corresponding technical solutions to depart from the spirit and scope of the technical solutions of the embodiments of this application.

What is claimed is:

1. A computer-implemented method for identifying skip-scanning, comprising:
   obtaining a video of a user scanning an item;
   extracting a plurality of video frames from the obtained video;
   determining posture data of the user based on the plurality of video frames, wherein the posture data comprises a location trajectory of the user's hand, and the determining of the posture data comprises:
   identifying a plurality of key points of the user's hand in the plurality of video frames;
   for each of the plurality of key points, determining a brightness pattern of the key point of the user's hand as the user's hand moves in the plurality of video frames;
   obtaining an optical flow corresponding to the key point based on the brightness pattern; and
   determining the location trajectory of the user's hand based on the optical flows of the plurality of key points of the user's hand;
   determining, according to the posture data of the user, a time period in which a scanning action of the user takes place;
   receiving a scanning result of the item; and
   determining whether the user has skipped scanning the item based on the scanning result and the time period.

2. The method according to claim 1, wherein the obtaining a video of a user scanning an item comprises:
   obtaining a video of a code scanning region in which the user is enabled to scan the item.

3. The method according to claim 2, wherein determining the posture data of the user further comprises:
   determining, based on the location trajectory of the user's hand, a first action of the user of moving the user's hand into a first boundary of the code scanning region; and
   determining, based on the location trajectory of the user's hand, a second action of the user of moving the user's hand out of a second boundary of the code scanning region; and
   determining the time period in which a scanning action of the user takes place comprises:
   determining the time period based on a timestamp of the first action of the user and a timestamp of the second action of the user.

4. The method according to claim 1, wherein the determining whether the user has skipped scanning the item comprises:
   determining whether an identifier of the item is scanned within the time period based on the scanning result; and determining that the user has skipped scanning the item upon determining that the identifier of the item is not scanned within the time period.

5. The method according to claim 1, wherein the determining whether the user has skipped scanning the item comprises:
obtaining an identifier of the item from the scanning result;
retrieving first attribute information of the item based on the obtained identifier;
identifying second attribute information of the item according to one or more frames of images of the video within the time period; and
determining that the user has skipped scanning the item in response to the first attribute information of the item being inconsistent with the second attribute information of the item.

6. The method according to claim 1, wherein the determining whether the user has skipped scanning the item comprises:
obtaining an identifier of the item from the scanning result;
retrieving a price of the item according to the identifier of the item scanned in the time period;
identifying a type of the item according to one or more frames of images of the video in the time period;
determining a lowest price according to the type; and
determining that the user has skipped scanning the item in response to the price of the item being lower than the lowest price.

7. The method according to claim 1, further comprising:
determining a quantity of items that the user has skipped scanning in response to an operation that the user confirms that scanning of the items is finished; and
settling one or more items scanned by the user in response to the quantity of the items that the user has skipped scanning being less than a threshold.

8. The method according to claim 7, further comprising:
displaying an interface indicating that a settlement is forbidden and/or sending warning information to an on-site monitoring terminal in response to the quantity being not less than the threshold.

9. The method according to claim 8, wherein after the displaying the interface indicating the settlement is forbidden, the method further comprises:
settling the one or more items scanned by the user in response to an operation of an on-site monitoring person associated with the on-site monitoring terminal.

10. The method according to claim 1, wherein determining the posture data of the user further comprises:
identifying, based on the location trajectory of the user's hand, the user's hand moving towards a first direction in the video as an action of picking up the item, and
identifying, based on the location trajectory of the user's hand, the user's hand moving towards a second direction in the video as an action of scanning the item; and
determining the time period in which a scanning action of the user takes place comprises:
determining the time period based on a timestamp of the action of picking up the item and a timestamp of the action of scanning the item.

11. The method according to claim 1, further comprising:
sending the obtained video to a back-end monitoring terminal, wherein the video is played by the back-end monitoring terminal.

12. The method according to claim 11, further comprising:
sending, to the back-end monitoring terminal, a warning instruction for controlling the back-end monitoring terminal to highlight the obtained video of the user upon determining that the user has skipped scanning the item.

13. The method according to claim 1, further comprising:
obtaining identity information of the user;
determining whether the identity information of the user is on a blacklist; and
displaying an interface indicating a settlement is forbidden and/or sending warning information to an on-site monitoring terminal in response to the identity information of the user being on the blacklist.

14. A system comprising one or more processors and one or more non-transitory computer-readable memories coupled to the one or more processors, the one or more non-transitory computer-readable memories storing instructions that, when executed by the one or more processors, cause the system to perform operations comprising:
obtaining a video of a user scanning an item;
extracting a plurality of video frames from the obtained video;
determining posture data of the user based on the plurality of video frames, wherein the posture data comprises a location trajectory of the user's hand, and the determining of the posture data comprises:
identifying a plurality of key points of the user's hand in the plurality of video frames;
for each of the plurality of key points of the user's hand, determining a brightness pattern of the key point of the user's hand based on a motion of the user's hand in the plurality of video frames;
obtaining an optical flow corresponding to the key point based on the brightness pattern; and
determining the location trajectory of the user's hand based on the optical flows of the plurality of key points of the user's hand;
determining, according to the posture data of the user, a time period in which a scanning action of the user takes place;
receiving a scanning result of the item; and
determining whether the user has skipped scanning the item based on the scanning result and the time period.

15. The system of claim 14, wherein the obtaining a video of a user scanning an item comprises:
obtaining a video of a code scanning region in which the user is enabled to scan the item.

16. The system of claim 15, wherein determining the posture data of the user further comprises:
determining, based on the location trajectory of the user's hand, a first action of the user of moving the user's hand into a first boundary of the code scanning region; and
determining, based on the location trajectory of the user's hand, a second action of the user of moving the user's hand out of a second boundary of the code scanning region; and
determining the time period in which a scanning action of the user takes place comprises:
determining the time period based on a timestamp of the first action of the user and a timestamp of the second action of the user.

17. The system of claim 14, wherein the determining whether the user has skipped scanning the item comprises:
determining whether an identifier of the item is scanned within the time period based on the scanning result; and determining that the user has skipped scanning the item upon determining that the identifier of the item is not scanned within the time period.

18. A non-transitory computer-readable storage medium configured with instructions executable by one or more processors to cause the one or more processors to perform operations comprising:
   obtaining a video of a user scanning an item;
   extracting a plurality of video frames from the obtained video;
   determining posture data of the user based on the plurality of video frames, wherein the posture data comprises a location trajectory of the user's hand, and the determining of the posture data comprises:
      identifying a plurality of key points of the user's hand in the plurality of video frames;
      for each of the plurality of key points, determining a brightness pattern of the key point of the user's hand as the user's hand moves in the plurality of video frames;
      obtaining an optical flow corresponding to the key point based on the brightness pattern; and
      determining the location trajectory of the user's hand based on the optical flows of the plurality of key points of the user's hand;
   determining, according to the posture data of the user, a time period in which a scanning action of the user takes place;
   receiving a scanning result of the item; and
   determining whether the user has skipped scanning the item based on the scanning result and the time period.

19. The non-transitory computer-readable storage medium of claim 18, wherein the obtaining a video of a user scanning an item comprises:
   obtaining a video of a code scanning region in which the user is enabled to scan the item.

20. The non-transitory computer-readable storage medium of claim 19, wherein determining the posture data of the user further comprises:
   determining, based on the location trajectory of the user's hand, a first action of the user of moving the user's hand into a first boundary of the code scanning region; and
   determining, based on the location trajectory of the user's hand, a second action of the user of moving the user's hand out of a second boundary of the code scanning region; and
   determining the time period in which a scanning action of the user takes place comprises:
      determining the time period based on a timestamp of the first action of the user and a timestamp of the second action of the user.

* * * * *